(12) United States Patent
Naruse et al.

(10) Patent No.: US 11,829,822 B2
(45) Date of Patent: Nov. 28, 2023

(54) PRINT DATA EDITING DEVICE EDITING PRINT DATA SUCH THAT PARTIAL IMAGE CORRESPONDING TO COLUMN IS SHIFTED BY SHIFT AMOUNT IN SUB-SCANNING DIRECTION

(71) Applicant: BROTHER KOGYO KABUSHIKI KAISHA, Nagoya (JP)

(72) Inventors: Yuki Naruse, Toyoake (JP); Isao Fukuchi, Gifu (JP); Mina Takechi, Nagoya (JP); Akira Minami, Nagoya (JP); Kohei Terada, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/053,549

(22) Filed: Nov. 8, 2022

(65) Prior Publication Data

US 2023/0142756 A1 May 11, 2023

(30) Foreign Application Priority Data

Nov. 8, 2021 (JP) ................................. 2021-182210

(51) Int. Cl.
  *G06K 15/02* (2006.01)
  *H04N 1/191* (2006.01)
  *H04N 1/053* (2006.01)

(52) U.S. Cl.
  CPC ....... *G06K 15/1873* (2013.01); *G06K 15/028* (2013.01); *G06K 15/1894* (2013.01); *H04N 1/053* (2013.01); *H04N 1/191* (2013.01)

(58) Field of Classification Search
  CPC .. G06K 15/1873; G06K 15/028; H04N 1/053; H04N 1/191
  See application file for complete search history.

(56) References Cited

U.S. PATENT DOCUMENTS

| 6,793,304 | B2* | 9/2004 | Kasahara | ................. B41J 11/42 347/5 |
| 2023/0144007 | A1* | 5/2023 | Takechi | ............... G06K 15/028 358/3.26 |

(Continued)

FOREIGN PATENT DOCUMENTS

| JP | 2009-148948 A | 7/2009 |
| JP | 2016-168794 A | 9/2016 |
| JP | 2017-047561 A | 3/2017 |

*Primary Examiner* — Scott A Rogers
(74) *Attorney, Agent, or Firm* — Kenealy Vaidya LLP

(57) ABSTRACT

A print data editing device is configured to perform: editing print data such that when dots constituting an input image represented by the print data are compared by units of columns before and after the editing, a coincidence is maximized when an image of each column in the input image after the editing is the same position as an image of the corresponding column in the input image before the editing or is shifted by a corresponding shift amount in a sub-scanning direction relative to the image of the corresponding column in the input image before the editing. An absolute value of at least one of shift amounts for columns in the input image after the editing is one dot or greater. An absolute difference value for any two neighboring columns in a main scanning direction in the input image after the editing is one dot or less.

20 Claims, 19 Drawing Sheets

(56) References Cited

U.S. PATENT DOCUMENTS

2023/0146630 A1\* 5/2023 Naruse ............... G06K 15/1898
  358/1.9
2023/0148298 A1\* 5/2023 Takechi ............... G06K 15/102
  358/1.15

\* cited by examiner

PRINT DATA EDITING DEVICE EDITING PRINT DATA SUCH THAT PARTIAL IMAGE CORRESPONDING TO COLUMN IS SHIFTED BY SHIFT AMOUNT IN SUB-SCANNING DIRECTION

REFERENCE TO RELATED APPLICATIONS

This application claims priority from Japanese Patent Application No. 2021-182210 filed on Nov. 8, 2021. The entire content of the priority application is incorporated herein by reference.

BACKGROUND ART

A conventional printing device uses a thermal line head provided with a plurality of heating elements to print on a print medium. When a printing device is operated using a power supply such as a battery and AC adapter, the electric current that can be supplied simultaneously to the thermal line head is limited by the specifications of the power supply. Therefore, the conventional printing device partially corrects print data based on the number of dots to be printed, creates print data by shifting dots in one predetermined dot line that forms a border to another dot line, and performs printing based on the print data, thereby suppressing the peak current value supplied to the thermal line head.

DESCRIPTION

However, the conventional printing device partially shifts a predetermined dot line to another dot line, resulting in poor reproducibility of the input image and edited areas that are easily noticeable.

In view of the foregoing, it is an object of the present disclosure to provide a print data editing device, a print data editing method, and a computer-readable storage medium storing computer-readable instructions for editing print data in order to improve printing quality over the conventional technology without compromising printing speed.

(1) In order to attain the above and other object, according to one aspect, the present disclosure provides a print data editing device. The print data editing device includes a controller. The controller is configured to edit print data to be used in a printing device. The printing device includes: a print head; and a conveying unit. The print head includes a plurality of elements. The plurality of elements is linearly arrayed in a main scanning direction. The conveying unit is configured to cause a print target and the print head to move relative to each other in a sub-scanning direction. The sub-scanning direction crosses the main scanning direction. The print data includes data indicating either ON or OFF for each of the plurality of elements. The printing device is configured to perform image formation on the print target on the basis of the print data while causing the print head and the print target to move relative to each other in the sub-scanning direction to thereby form an image represented by the print data on the print target. The printing device is configured to form the image on the print target line by line by causing, on the basis of the print data, selected one or more of the plurality of elements to be driven. The image represented by the print data is constituted by a plurality of dots defined by the plurality of elements. The controller is configured to perform: (a) acquiring; and (b) editing. The acquiring in (a) acquires print data representing an input image. The editing in (b) edits the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b). Each column includes all the dots aligned in the sub-scanning direction from an upstream end toward a downstream end in the sub-scanning direction. An absolute value of at least one of the shift amounts for the columns in the input image after the editing in (b) is one dot or greater. An absolute difference value for any two neighboring columns in the main scanning direction in the input image after the editing in (b) is one dot or less. The absolute difference value for two columns is an absolute value of a difference in the shift amounts between the two columns.

By performing the editing in (b), the print data editing device according to aspect (1) can edit the print data to suppress the peak current in the print head of the printing device required for printing one line. Since the print data editing device performs the editing in (b) by comparing all dots aligned in the sub-scanning direction in units of columns in order that coincidence is maximized when an image included in a column of the input image represented by the print data before the editing in (b) is at the same position as an image included in a column of the print image represented by the print data after the editing in (b) or has been shifted by a shift amount in the sub-scanning direction relative to an image included in a column of the print image represented by the print data after the editing in (b), the print data editing device can produce a print image in which edited parts are less unnoticeable than in a method of partially editing dots included in the input image represented by the print data before the editing in (b), as in the conventional technology, without sacrificing printing speed. Further, the print data editing device keeps the absolute value of differences in shift amounts for two columns neighboring each other in the main scanning direction less than or equal to one dot so that areas of the print image that have been changed from the input image are less noticeable, enabling the printing device to suppress changes to the extent that they are visually imperceptible. Accordingly, the print data editing device can edit print data to improve printing quality compared to the conventional device without sacrificing printing speed.

(2) According to another aspect, the present disclosure also provides a print data editing device. The print data editing device includes a controller. The controller is configured to edit print data to be used in a printing device. The printing device includes: a print head; and a conveying unit. The print head includes a plurality of elements. The plurality of elements is linearly arrayed in a main scanning direction. The conveying unit is configured to cause a print target and the print head to move relative to each other in a sub-scanning direction. The sub-scanning direction crosses the main scanning direction. The print data includes data indicating either ON or OFF for each of the plurality of elements. The printing device is configured to perform image formation on the print target on the basis of the print data while causing the print head and the print target to move relative to each other in the sub-scanning direction to thereby form an image represented by the print data on the print target. The printing device is configured to form the image on the print target line by line by causing, on the basis of the print data, selected one or more of the plurality of elements to be driven. The image represented by the print data is constituted by a plurality of dots defined by the plurality of elements. The controller is configured to perform: (a) acquiring; and (b) editing. The acquiring in (a) acquires print data representing an input image. The editing in (b) edits the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b). Each column includes the dots continuously aligned in the sub-scanning direction from an upstream end toward a downstream end in the sub-scanning direction. An absolute value of at least one of the shift amounts for the columns in the input image after the editing in (b) is one dot or greater. An absolute difference value for any two neighboring columns in the main scanning direction in the input image after the editing in (b) is less than or equal to 150 µm. The absolute difference value for two columns is an absolute value of a difference in the shift amounts between the two columns.

By performing the editing in (b), the print data editing device according to aspect (2) can edit the print data to suppress the peak current in the print head of the printing device required for printing one line. Since the print data editing device performs the editing in (b) by comparing all dots aligned in the sub-scanning direction in units of columns in order that coincidence is maximized when an image included in a column of the input image represented by the print data before the editing in (b) is at the same position as an image included in a column of the print image represented by the print data after the editing in (b) or has been shifted by a shift amount in the sub-scanning direction relative to an image included in a column of the print image represented by the print data after the editing in (b), the print data editing device can produce a print image in which edited parts are less unnoticeable than in a method of partially editing dots included in the input image represented by the print data before the editing in (b), as in the conventional technology, without sacrificing printing speed. Further, the print data editing device keeps the absolute value of differences in shift amounts for two columns neighboring each other in the main scanning direction less than or equal to 150 µm so that areas of the print image that have been changed from the input image are less noticeable, enabling the printing device to suppress changes to the extent that they are visually imperceptible. Accordingly, the print data editing device can edit print data to improve printing quality compared to the conventional device without sacrificing printing speed.

(3) According to still another aspect, the present disclosure also provides a print data editing method performed by a controller of a print data editing device. The print data editing device is configured to edit print data to be used in a printing device. The printing device includes: a print head; and a conveying unit. The print head includes a plurality of elements. The plurality of elements is linearly arrayed in a main scanning direction. The conveying unit is configured to cause a print target and the print head to move relative to each other in a sub-scanning direction. The sub-scanning direction crosses the main scanning direction. The print data includes data indicating either ON or OFF for each of the plurality of elements. The printing device is configured to perform image formation on the print target on the basis of the print data while causing the print head and the print target to move relative to each other in the sub-scanning direction to thereby form an image represented by the print data on the print target. The printing device is configured to form the image on the print target line by line by causing, on the basis of the print data, selected one or more of the plurality of elements to be driven. The image represented by the print data is constituted by a plurality of dots defined by the plurality of elements. The print data editing method includes: (a) acquiring; and (b) editing. The acquiring in (a) acquires print data representing an input image. The editing in (b) edits the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b). Each column includes the dots continuously aligned in the sub-scanning direction from an upstream end toward a downstream end in the sub-scanning direction. An absolute value of at least one of the shift amounts for the columns in the input image after the editing in (b) is one dot or greater. An absolute difference value for any two neighboring columns in the main scanning direction in the input image after the editing in (b) is less than or equal to one dot or less than or equal to 150 µm. The absolute difference value for two columns is an absolute value of a difference in the shift amounts between the two columns.

The print data editing method according to aspect (3), when performed by the controller of the print data editing device, has the same effects as the print data editing device according to aspect (1) or aspect (2).

(4) According to still another aspect, the present disclosure also provides a non-transitory computer-readable storage medium storing a set of computer-readable instructions for a print data editing device. The print data editing device includes a processor. The processor is configured to edit print data to be used in a printing device. The printing device includes: a print head; and a conveying unit. The print head includes a plurality of elements. The plurality of elements is linearly arrayed in a main scanning direction. The conveying unit is configured to cause a print target and the print head to move relative to each other in a sub-scanning direction. The sub-scanning direction crosses the main scanning direction. The print data includes data indicating either ON or OFF for each of the plurality of elements. The printing device is configured to perform image formation on the print target on the basis of the print data while causing the print head and the print target to move relative to each other in the sub-scanning direction to thereby form an image represented by the print data on the print target. The printing device is configured to form the image on the print target line by line by causing, on the basis of the print data, selected one or more of the plurality of elements to be driven. The image represented by the print data is constituted by a plurality of dots defined by the plurality of elements. The set of computer-readable instructions, when executed by the processor, causes the print data editing device to perform: (a) acquiring; and (b) editing. The acquiring in (a) acquires print data representing an input image. The editing in (b) edits the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b). Each column includes the dots continuously aligned in the sub-scanning direction from an upstream end toward a downstream end in the sub-scanning direction. An absolute value of at least one of the shift amounts for the columns in the input image after the editing in (b) is one dot or greater. An absolute difference value for any two neighboring columns in the main scanning direction in the input image after the editing in (b) is less than or equal to one dot or less than or equal to 150 µm. The absolute difference value for two columns is an absolute value of a difference in the shift amounts between the two columns.

The set of computer-readable instructions stored in the non-transitory computer-readable storage medium according to aspect (4), when executed by the processor of the print data editing device, have the same effects as the print data editing device according to aspect (1) or aspect (2).

Figure 13:
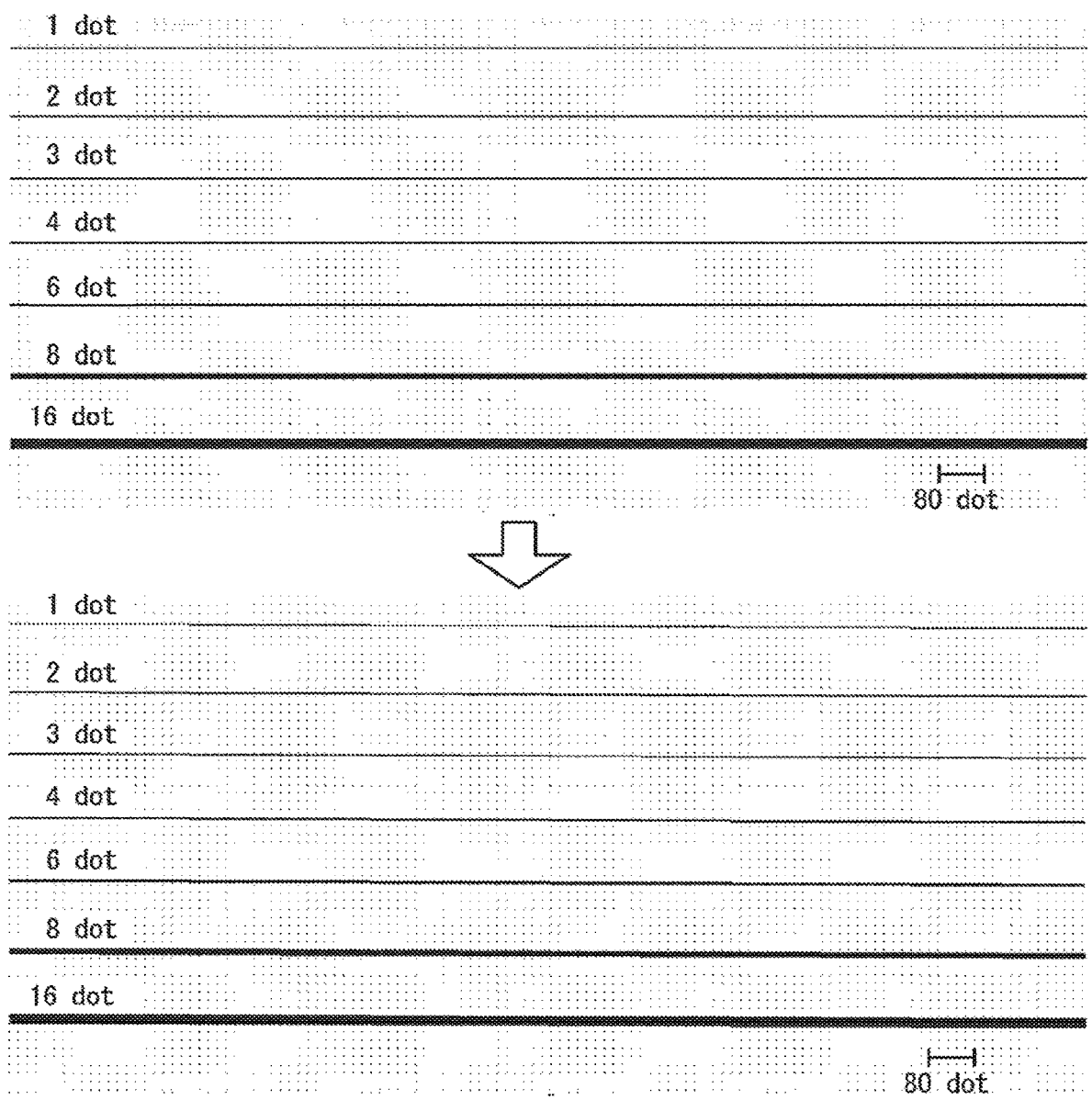

FIG. 13 is an explanatory diagram illustrating comparison of an image before and after the editing process and the conversion process are performed on a border extending in a main scanning direction and included in the image under the condition that the absolute value of the difference in shift amounts between any two rectangular partial images adjacent in the main scanning direction be less than or equal to 150 µm.

Figure 14:
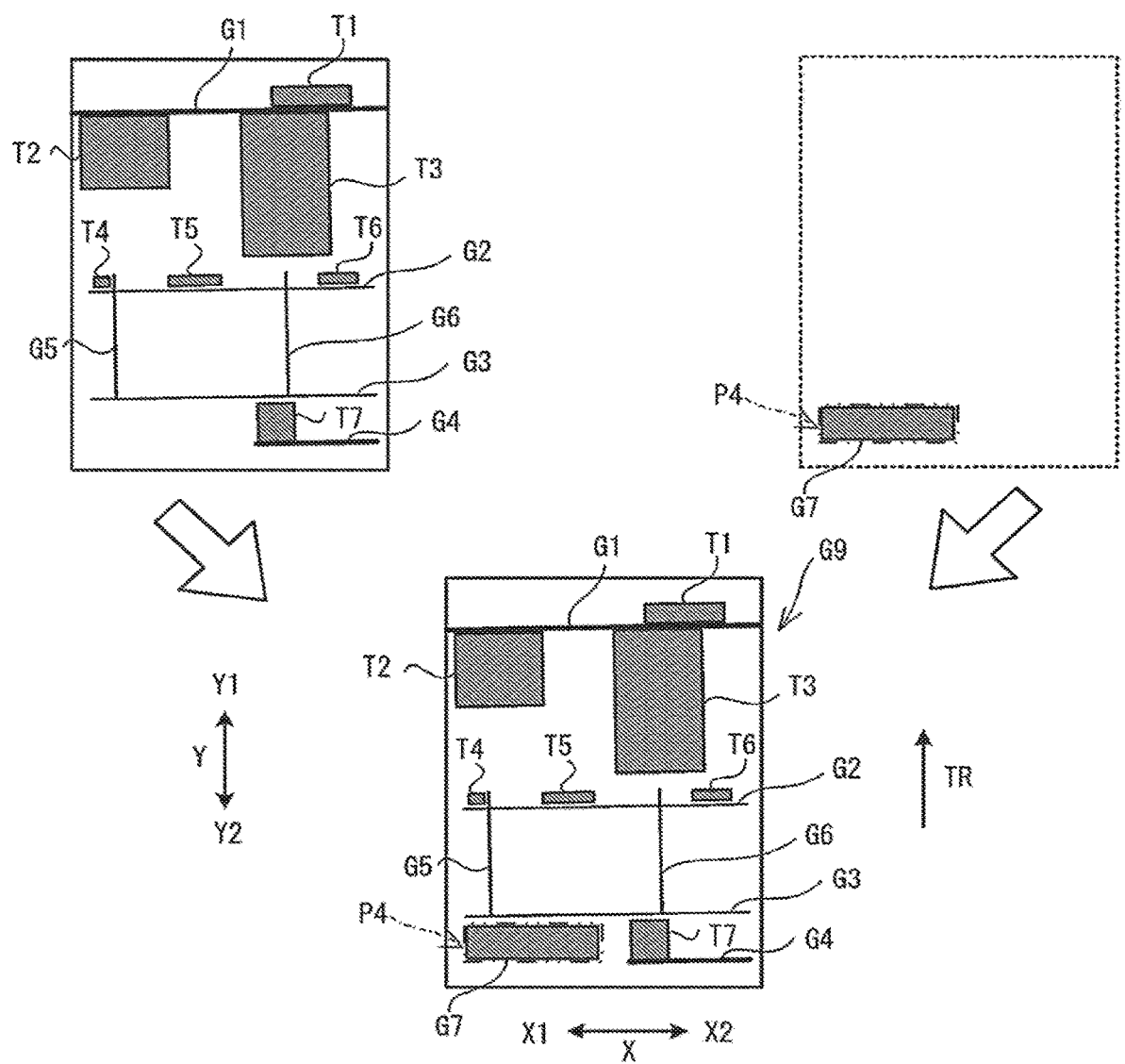

FIG. 14 is an explanatory diagram illustrating a process to generate one example of a composite image.

Figure 15:
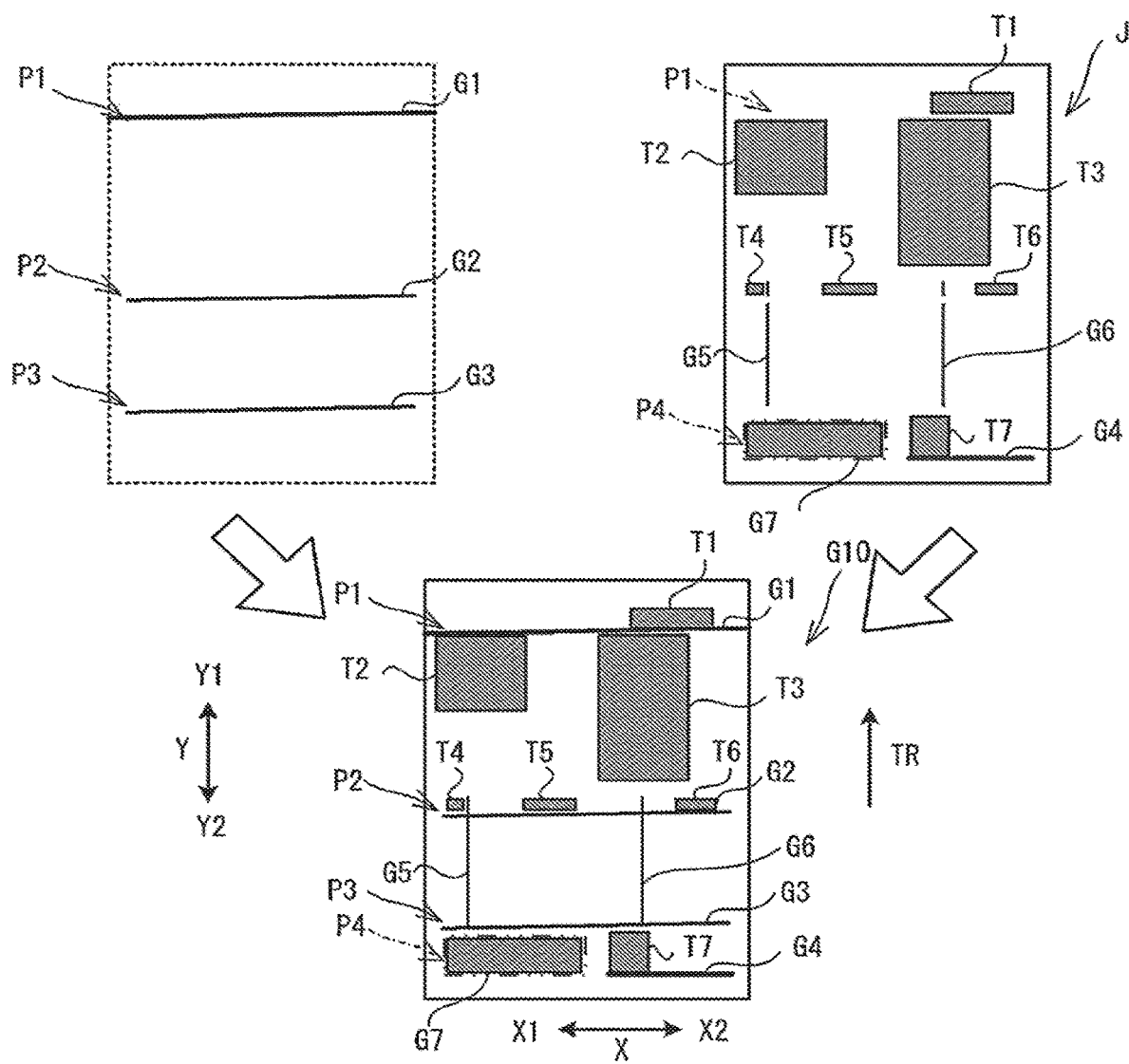

FIG. 15 is an explanatory diagram illustrating a process to generate another example of a composite image.

Figure 16:
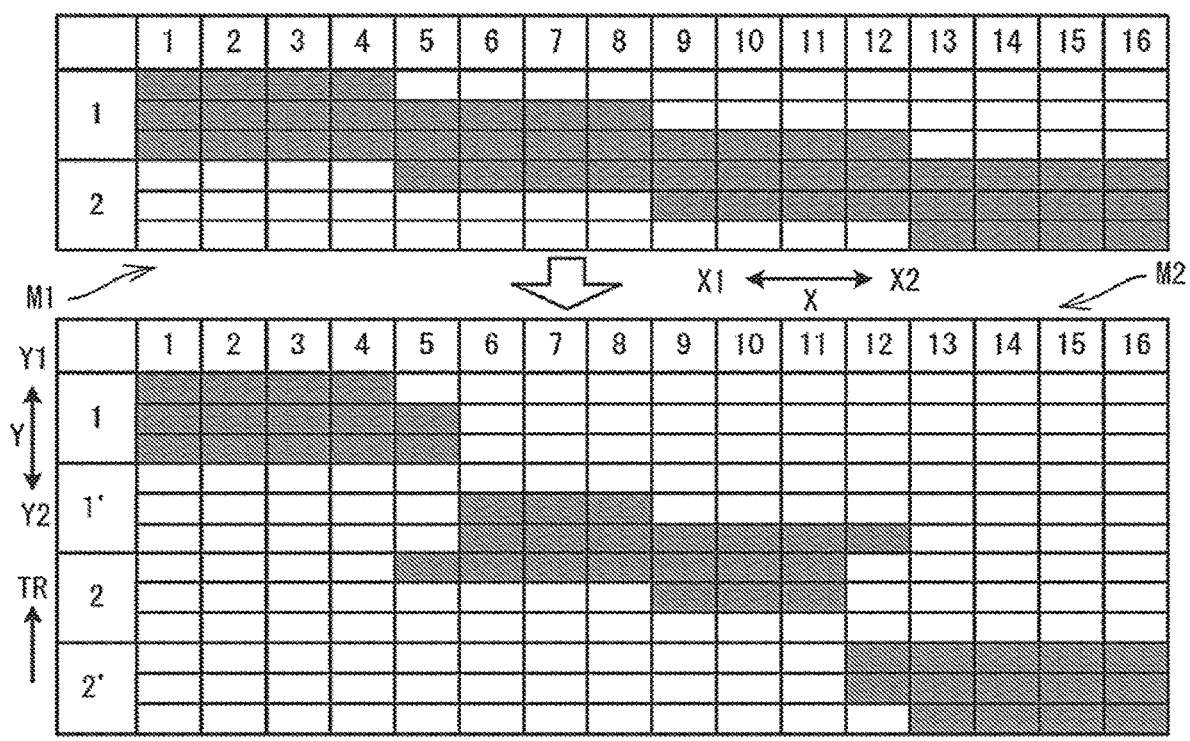

FIG. 16 is an explanatory diagram illustrating one example of a dividing process.

Figure 17:
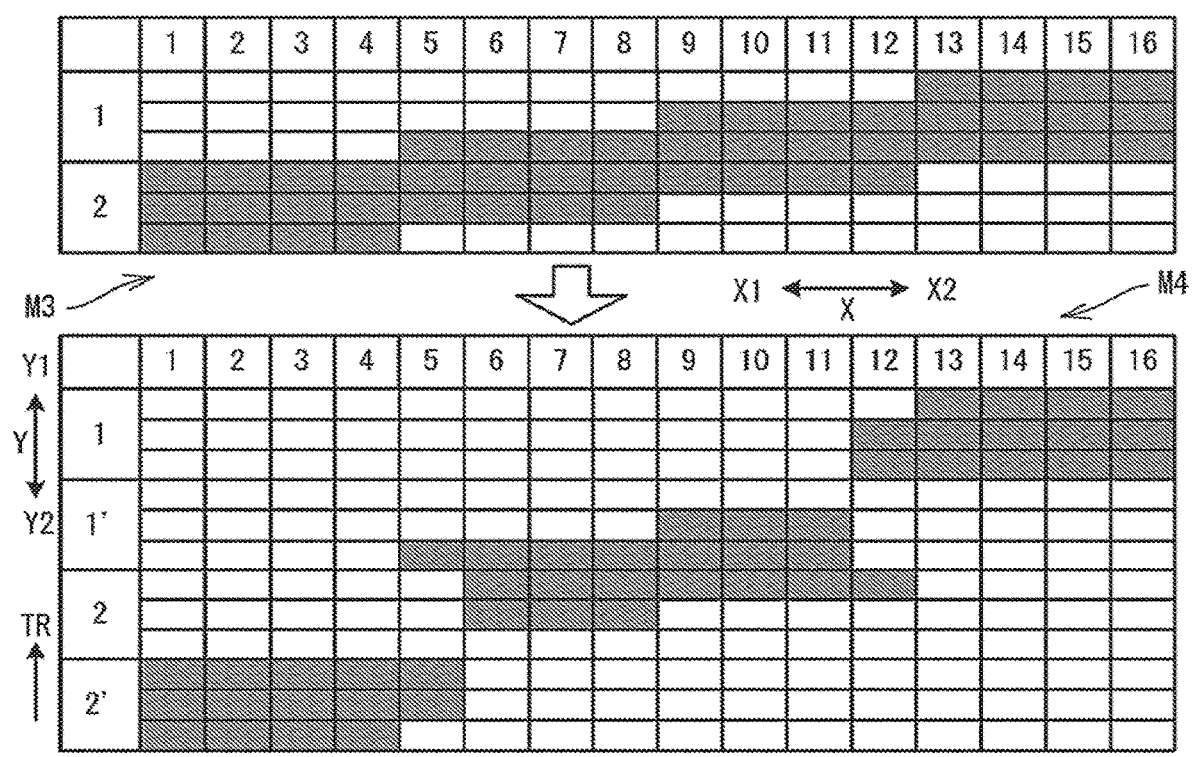

FIG. 17 is an explanatory diagram illustrating another example of the dividing process.

Figure 18:
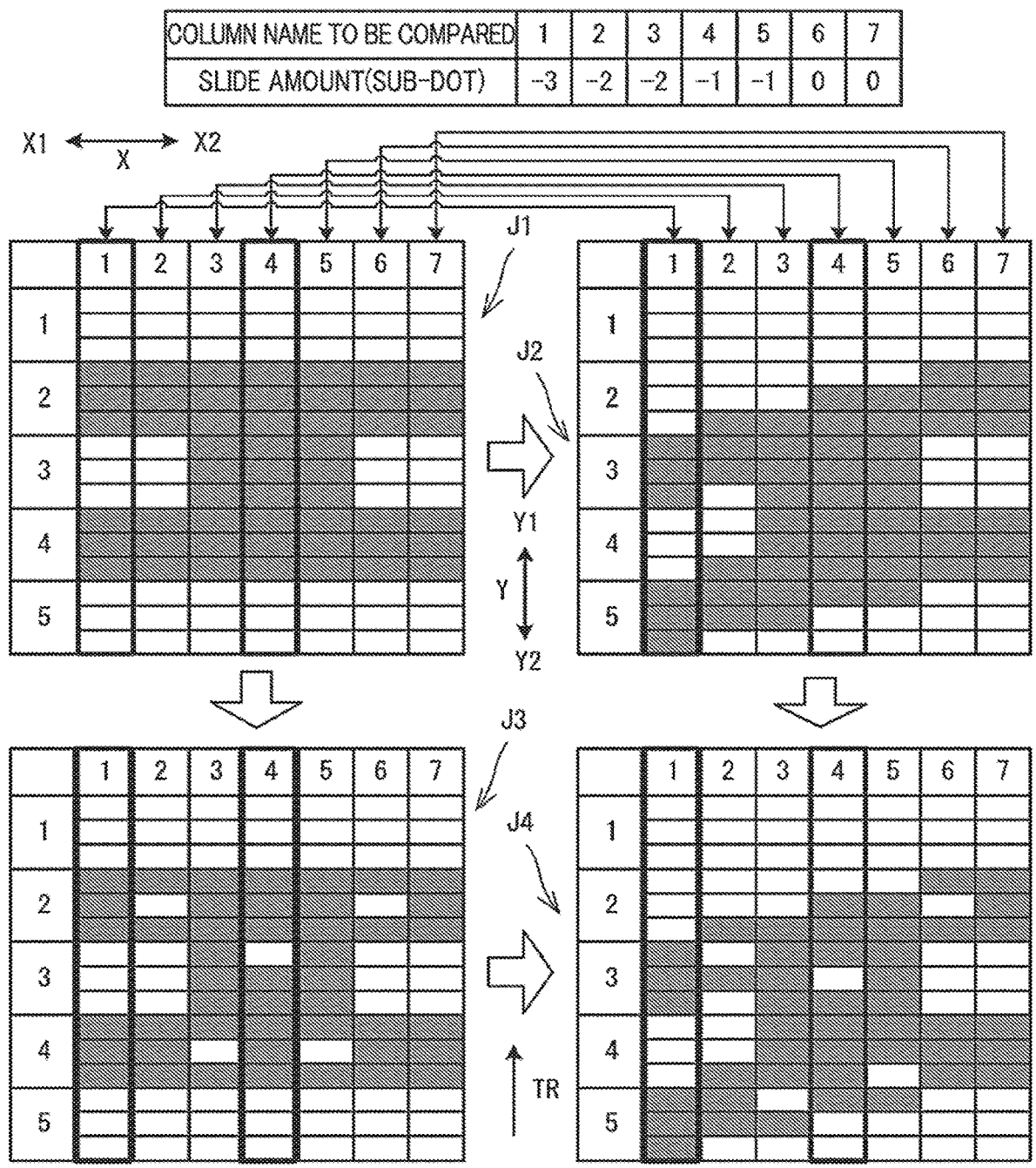

FIG. 18 is an explanatory diagram illustrating a first condition, a second condition, and a third condition that are met in the editing method.

Figure 19:
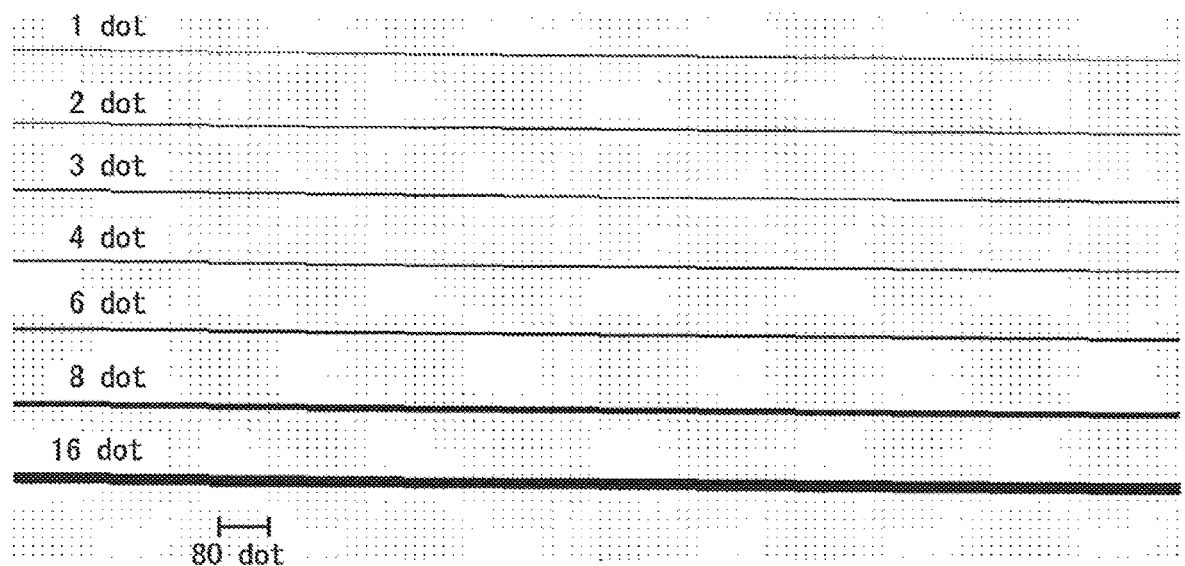

FIG. 19 is an explanatory diagram illustrating comparison of an image before and after the editing process and the conversion process are performed on a border extending in the main scanning direction and included in the image under the condition that the absolute value of the difference in shift amounts between any two rectangular partial images adjacent in the main scanning direction be less than or equal to 300 µm.

A printing device 1 according to one embodiment of the present disclosure will be described while referring to the accompanying drawings. The drawings will be used to describe the technical features made possible with the present disclosure. In other words, the configurations and control of the device depicted in the drawings are not limited thereto but are merely illustrative examples.

Figure 1:
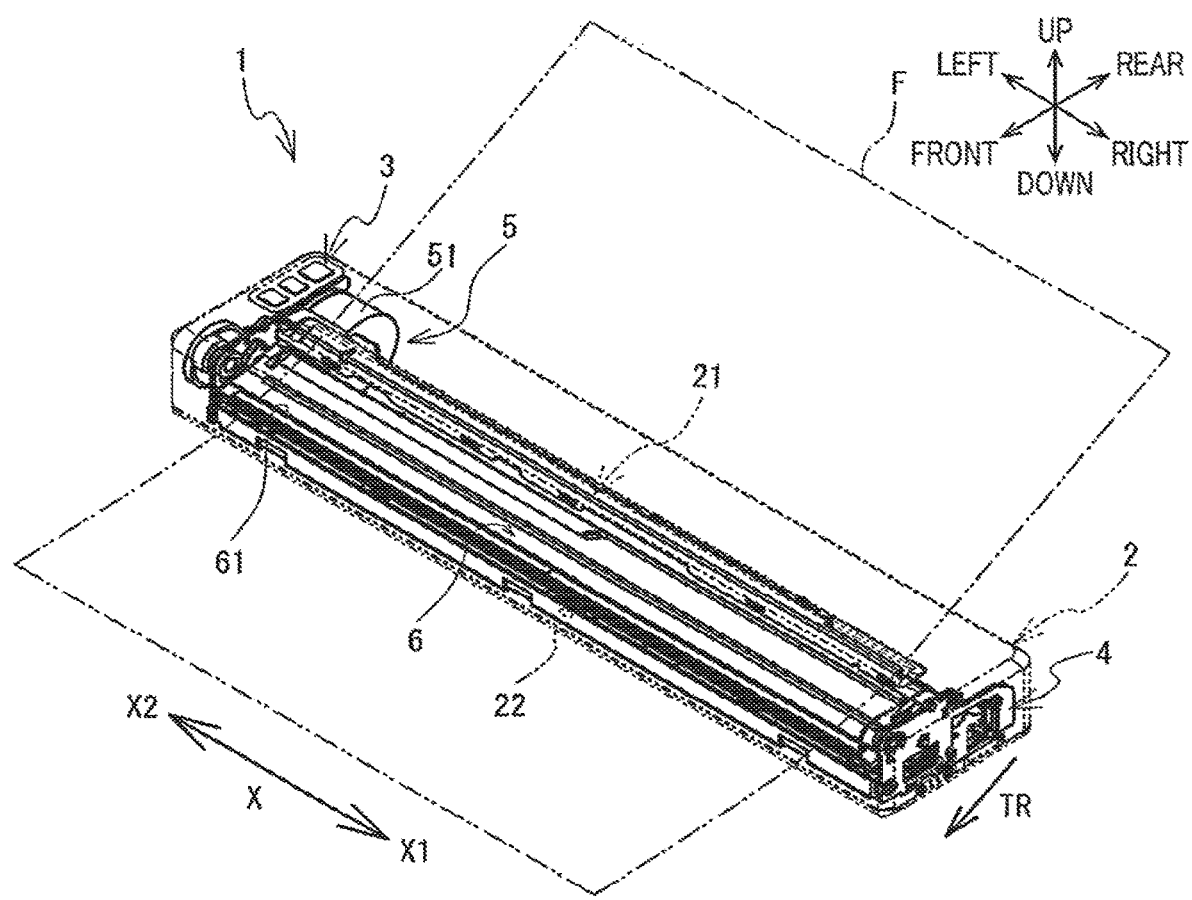
FIG. 1 is a perspective view of a printing device.

As shown in FIG. 1, the printing device 1 is a thermal printer capable of printing characters (objects such as letters, symbols, numbers, and figures) on a print target F. The print target F is not limited to any specific medium, but may be in a sheet or tape form, for example. In the present embodiment, the print target F is a cut sheet of a thermal recording medium. The printing device 1 also functions as the print data editing device that edits print data.

Figure 2:
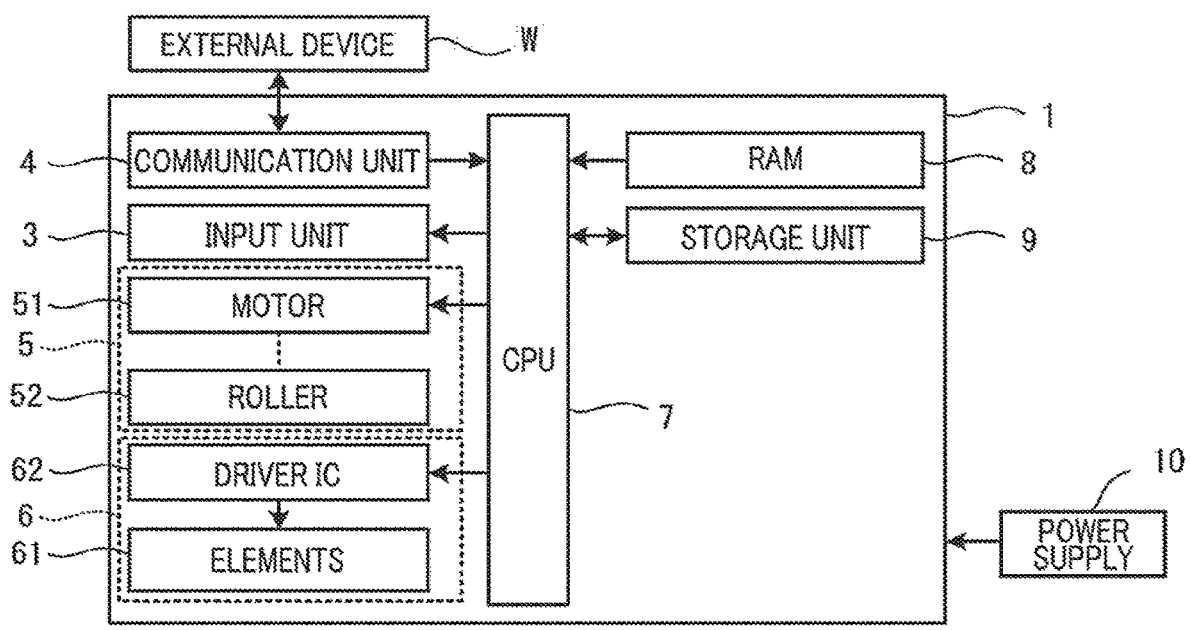
FIG. 2 is a block diagram of the electrical configuration of the printing device.

The printing device 1 is provided with a case 2, an input unit 3, a communication unit 4, a conveying unit 5, and a print head 6. The case 2 has a rectangular parallelepiped shape that is longer in the left-right direction than the front-rear and up-down directions. The case 2 houses the conveying unit 5 and the print head 6. A power supply 10 shown in FIG. 2 is detachably accommodated in the case 2. The power supply 10 supplies power to the printing device 1. An insertion opening 21 is formed in the top surface of the case 2, and a discharge opening 22 is formed in the front surface of the case 2. The insertion opening 21 and discharge opening 22 are each formed in a rectangular shape that is elongated in the left-right direction. The print target F is inserted into the printing device 1 through the insertion opening 21 and is discharged from the printing device 1 through the discharge opening 22. The input unit 3 is disposed on the top surface of the case 2 near the left end thereof. The input unit 3 includes a plurality of pushbuttons. The communication unit 4 is a USB jack provided on the right surface of the case 2. The communication unit 4 can be connected to a USB cable connector.

The conveying unit 5 is provided with a motor 51, and a roller 52 shown in FIG. 2. The roller 52 is provided in the upper-front region inside the case 2 and is centered on an axis extending in the left-right direction. The motor 51 rotates the roller 52. By rotating the roller 52 to convey the print target F in a conveying direction TR, the conveying unit 5 moves the print target F relative to the print head 6. The conveying direction TR is orthogonal to the left-right direction. In the present embodiment, the conveying direction TR extends diagonally from the upper-rear to the lower-front. In the following description, the upper-rear side in the conveying direction TR will be called the upstream side, while the lower-front side will be called the downstream side.

The print head 6 is disposed below the roller 52. The print head 6 is a line head that includes a plurality of elements 61, and a driver IC 62 shown in FIG. 2. The elements 61 in the present embodiment are heating elements that generate heat when energized. The elements 61 print on the print target F by generating heat while contacting the print target F, which is pressed downward by the roller 52. The driver IC 62 selectively energizes elements 61 to generate heat therein.

Next, the electrical configuration of the printing device 1 will be described with reference to FIG. 2. In addition to the communication unit 4, input unit 3, conveying unit 5, and print head 6 described above, the printing device 1 is provided with a CPU 7, a RAM 8, and a storage unit 9. The conveying unit 5 is provided with the motor 51, and the roller 52. The print head 6 is provided with the driver IC 62, and the plurality of elements 61. The CPU 7 controls the printing device 1. The CPU 7 is electrically connected to the RAM 8, storage unit 9, communication unit 4, input unit 3, motor 51, and driver IC 62. The RAM 8 stores various variables and other temporary data. The storage unit 9 stores programs, such as a print data editing program to be described later, that the CPU 7 executes for controlling the printing device 1. The storage unit 9 also stores print data, and various settings information. The communication unit 4 is a controller for communicating with an external device W via a USB cable. The external device W is a well-known information processing device, such as a PC, a table computer, or a smartphone.

Next, a printing operation performed on the printing device 1 will be described. The printing device 1 selectively energizes elements 61 in the print head 6 based on print data. The elements 61 apply thermal energy to areas of the print target F contacting the energized elements 61. Through this process, the printing device 1 forms a pixel row aligned in a main scanning direction X in correspondence with the array of elements 61. The printing device 1 intermittently energizes elements 61 a plurality of times while driving the motor 51 to rotate the roller 52 in order to convey the print target F downstream in the conveying direction TR. As a result, the printing device 1 forms a plurality of lines juxtaposed on the print target F in a direction orthogonal to the direction in which pixels are aligned in one line image. The plurality of lines forms a print image on the print target F in a shade that depends on the formation or non-formation of each pixel. The above operation will be called a "printing operation."

In the following description, the direction in which the elements 61 are aligned will be called the "main scanning direction X," and the printing unit corresponding to a single pixel row extending in the main scanning direction X will be called a "line." The direction in which a plurality of lines is juxtaposed will be called a "sub-scanning direction Y" The sub-scanning direction Y is defined by the conveying direction TR. Printing units corresponding to individual elements 61 will be called "pixels" or "dots." Printing units that result from dividing a "dot" into a plurality of parts in the sub-scanning direction Y will be called "sub-dots." A printing unit corresponding to a row of sub-dots aligned in the main scanning direction X will be called a "sub-line."

Next, a printing process performed on the printing device 1 will be described with reference to FIGS. 3 through 18 using an input image G shown in FIG. 4 as a specific example. As illustrated in FIG. 4, the input image G is an image representing an invoice in English text that is to be printed on A4-size thermal paper. In FIG. 4, the left-right direction of the input image G corresponds to the main scanning direction X, while the up-down direction of the input image G corresponds to the sub-scanning direction Y. The left side of the input image G corresponds to a first side X1 in the main scanning direction X while the right side of the input image G corresponds to a second side X2 in the main scanning direction X. The top of the input image G corresponds to a downstream side Y1 in the sub-scanning direction Y, and the bottom of the input image G corresponds to an upstream side Y2 in the sub-scanning direction Y. The input image G includes a plurality of borders G1-G4 extending in the main scanning direction X, a plurality of borders G5 and G6 extending in the sub-scanning direction Y, a barcode G7, and text areas T1-T7. In FIGS. 6, 8, 14, and 15, the text areas T1-T7 are represented schematically by shaded rectangles. Within the printing region defined by the print data, areas configured of sub-dots whose print data is ON will be called "printing areas," while areas configured of sub-dots whose print data is OFF will be called "non-printing areas." In the present embodiment, the area outside the printing region is also considered a non-printing area.

The user selects an input image G to be printed, designates one of a feature area, a target area, and a non-target area as necessary, and subsequently inputs a start instruction via the input unit 3. A feature area is a distinctive part of the input image G, such as a barcode, that should not be subjected to editing and conversion processes described later. In this example, an area P4 that includes the barcode G7 is identified as a feature area on the basis of information received with the input image G or through pattern matching. A target area is a portion of the input image G which the user has designated to be subjected to editing and conversion processes. In this example, an area P1 that includes the border G1, an area P2 that includes the border G2, and an area P3 that includes the border G3 have been designated target areas. A non-target area is part of the input image G that the user has designated not to be subjected to editing and conversion processes. In this example, the area P4 has been designated a non-target area.

When detecting a start instruction, the CPU 7 reads the print data editing program for executing a printing process from the storage unit 9 into the RAM 8. The CPU 7 executes the printing process having the following steps according to instructions included in this print data editing program. Various data obtained in the course of the printing process is stored in the storage unit 9 as appropriate. Hereinafter, "step" will be abbreviated as "S". In FIGS. 5, 10-12, and 16-18, some of the sub-dots corresponding to print data are depicted in a matrix. Sub-dots specified as ON in the print data are depicted as shaded, while sub-dots specified as OFF in the print data are left white. The left-right direction and up-down direction in these drawings correspond to the main scanning direction X and sub-scanning direction Y, respectively. Column names represented by numbers denote identification numbers assigned to each of the elements 61 in order from the first side X1 toward the second side X2 in the main scanning direction X. Row names represented by numbers denote identification numbers for each line to be printed by the elements 61. The printing device 1 forms images on the print target F in ascending order of line numbers.

Figure 3:
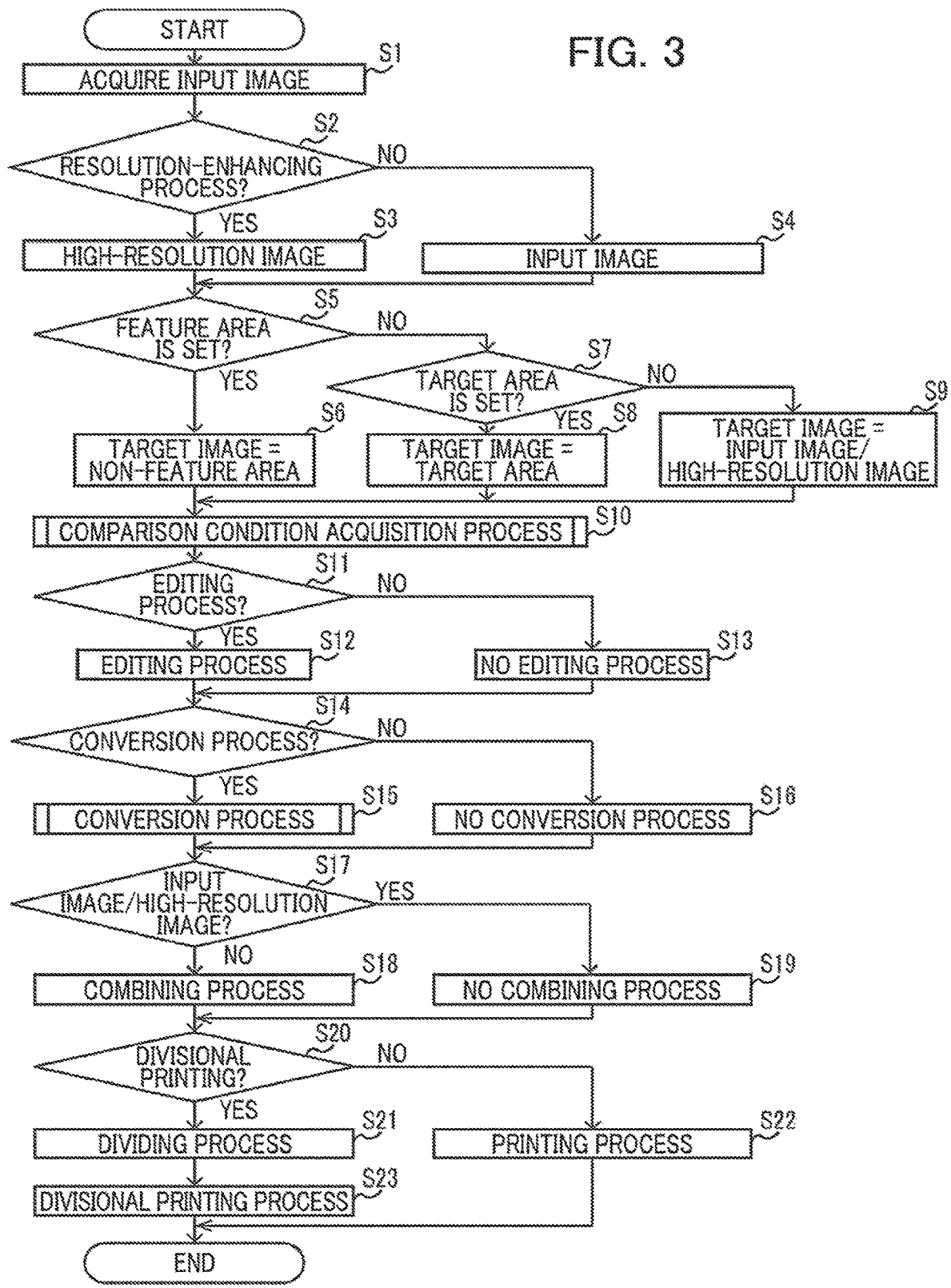
FIG. 3 is a flowchart illustrating steps in a printing process executed in the printing device.
Figure 4:
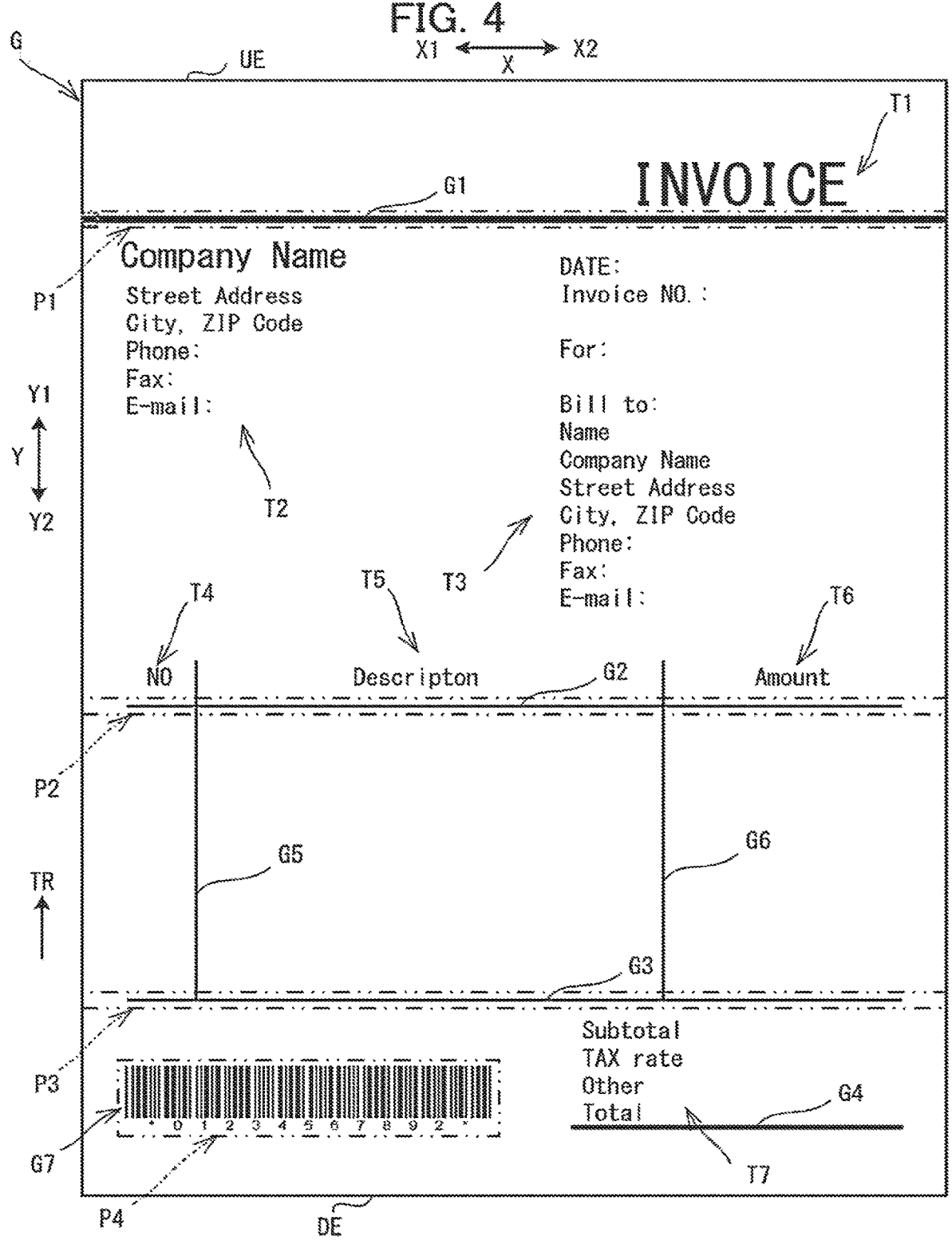
FIG. 4 is an explanatory diagram of an input image in a specific example.

In S1 of FIG. 3, the CPU 7 acquires image data representing the input image G. The image data is data corresponding to the plurality of elements 61 aligned in the main scanning direction X. Here, the CPU 7 may acquire image data from the external device W via the communication unit 4, for example. This image data may be generated by the external device W and may represent an image having a higher resolution in the sub-scanning direction Y than the resolution defined by the elements 61. The CPU 7 may also acquire image data generated by the external device W that represents an image having a resolution no greater than the resolution in the sub-scanning direction Y defined by the elements 61. The CPU 7 may also acquire image data from the storage unit 9 or image data edited through operations on the input unit 3. Hereinafter, the resolution of an image represented by image data will also be referred to simply as the resolution of the image data.

In S2 the CPU 7 determines whether to perform a resolution-enhancing process. The resolution-enhancing process is performed on the image data acquired in S1 that represents the input image G in order to increase the resolution of the image data in the sub-scanning direction Y by dividing each line in the sub-scanning direction Y. Here, the CPU 7 does not perform the resolution-enhancing process when the image data acquired in S1 has been generated by the external device W and has a higher resolution in the sub-scanning direction Y than the resolution defined by the elements 61, for example. The CPU 7 performs the resolution-enhancing process when the image data acquired in S1 has a resolution in the sub-scanning direction Y no greater than the resolution defined by the elements 61, for example.

Figure 5:
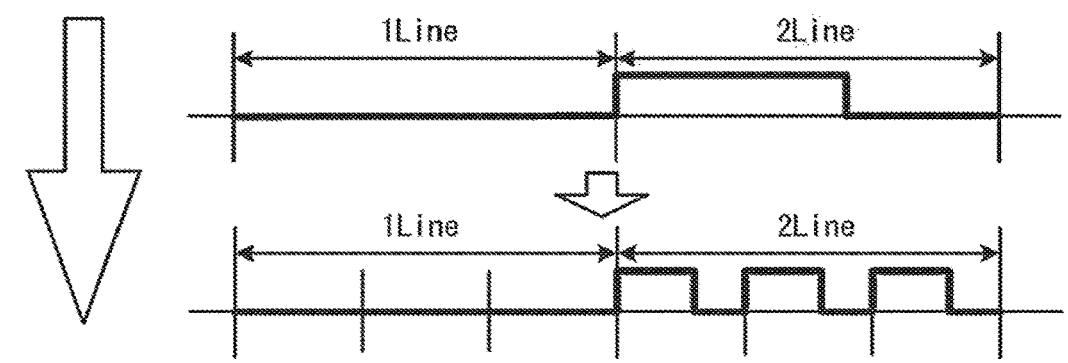
FIG. 5 is an explanatory diagram illustrating a process to generate high-resolution image.
Figure 6:
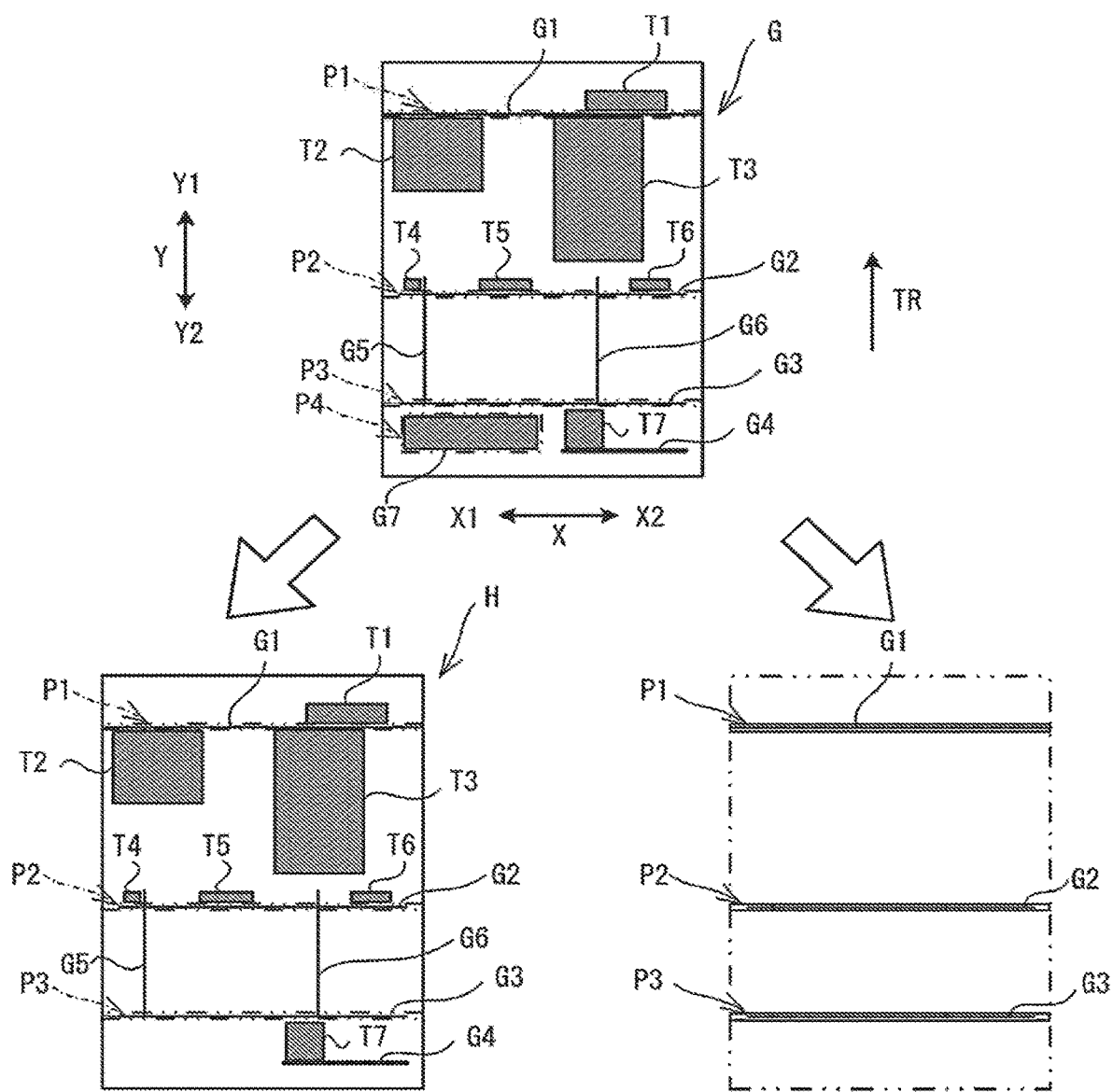
FIG. 6 is an explanatory diagram illustrating a setting method for a target image.

When the CPU 7 determines that the resolution-enhancing process is to be executed (S2: YES), in S3 the CPU 7 performs the resolution-enhancing process to increase the resolution of the image data in the sub-scanning direction Y by dividing each line in the sub-scanning direction Y. In the example of FIG. 5, the CPU 7 divides each line into three equal parts in the sub-scanning direction Y. The number of divisions in each line may be modified as needed. By dividing each line equally in the sub-scanning direction Y, the printing start timings for the sub-lines are set to equal periods. Here, three consecutive sub-dots in the sub-scanning direction Y correspond to one dot. The CPU 7 sets, as the printing area, all sub-dots produced by dividing dots of the printing area. On the other hand, the CPU 7 sets, as the non-printing area, all sub-dots produced by dividing a dot of the non-printing area. When the CPU 7 determines that the resolution-enhancing process will not be executed (S2: NO), in S4 the CPU 7 performs no processing on the input image G acquired in S1.

Following either S3 or S4, in S5 the CPU 7 determines whether a feature area has been set in the input image G acquired in S1. When the feature area P4 has been set in the input image G (S5: YES), in S6 the CPU 7 sets a non-feature area H as the target image (target image H shown in the middle of FIG. 8) to be subjected to an editing process, as shown in the lower left of FIG. 6. The non-feature area H is the portion of the high-resolution image produced in S3 or the input image G of S4 excluding the feature area P4. The process in S6 sets the target image so that if a specific pattern is included in the input image G, the editing process is not performed on that specific pattern.

If a feature area has not been set in the input image G (S5: NO), in S7 the CPU 7 determines whether a target area has been set in the input image G acquired in S1. When the target areas P1-P3 have been set in the input image G (S7: YES), in S8 the CPU 7 sets these target areas P1-P3 as the target image, as shown in the lower right of FIG. 6. The process in S8 sets the target image so that when target areas P1-P3 are designated in the input image G, the editing process is executed only on the target areas P1-P3 and not on non-target areas, i.e., areas other than the target areas P1-P3.

When a non-target area P4 has been set in the input image G, the CPU 7 determines that the areas other than the set non-target area P4 have been set as the target area (S7: YES). In S8 the CPU 7 determines that the area H of the high-resolution image produced in S3 or the input image G of S4 that excludes the non-target area P4 is the target area and sets this target area as the target image, as shown in the lower left of FIG. 6. The process in S8 sets the target image so that when a non-target area P4 has been designated in the input image G, the editing process is not executed on the non-target area P4 but is only executed on the target area H excluding the non-target area P4. If no target area has been set in the input image G, i.e., none of a target area and a non-target area has been designated in the input image G (S7: NO), in S9 the CPU 7 sets the high-resolution image produced in S3 or the input image G of S4 as the target image.

Following S6, S8, or S9, in S10 the CPU 7 performs a comparison condition acquisition process. The comparison condition acquisition process is performed to acquire a condition used to determine whether to perform the editing process. In this embodiment, the CPU 7 acquires, as factors used in the condition for determining whether to perform the editing process, the printing speed when the editing process is performed and the printing speed when the editing process is not performed. The editing process is performed to reduce the peak number of elements 61 to be energized (hereinafter referred to as the "number of ON dots") and involves moving a plurality of sub-dots in a given line in the sub-scanning direction Y according to a predetermined rule in order to distribute the sub-dots among a plurality of lines.

Figure 7:
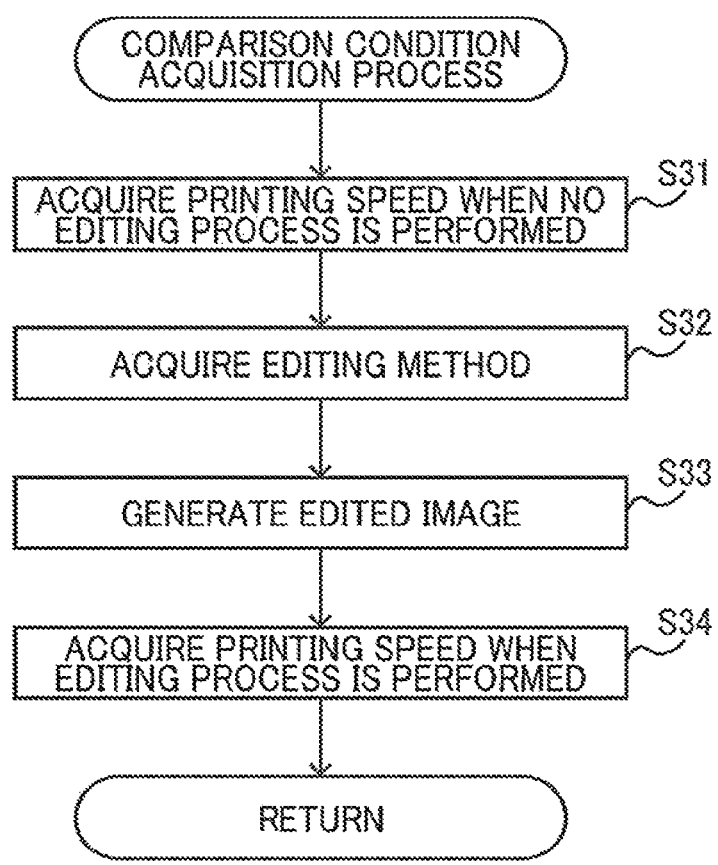
FIG. 7 is a flowchart illustrating steps in a comparison condition acquisition process executed in the printing process.

As shown in FIG. 7, in S31 of the comparison condition acquisition process the CPU 7 acquires the printing speed when no editing process is performed. When a line has a greater number of ON dots than a threshold value, the CPU 7 divides the elements 61 for that line into a plurality of blocks. The printing device 1 then prints one line image by energizing the blocks at different timings, i.e., by dividing energization of the elements 61 into a plurality of times corresponding to the number of blocks. Printing performed in this manner is called "divisional printing." The printing speed in divisional printing is slower than that when divisional printing is not performed depending on the number of lines for which divisional printing is performed and the number of blocks in those lines. The CPU 7 acquires the printing speed when no editing process is performed by taking into account the number of lines and blocks that are to be used in divisional printing.

In S32 the CPU 7 acquires an editing method to be used in the current editing process from among a plurality of editing methods. This editing method may be specified by the user or selected by the CPU 7 based on the type, size, and the like of the input image G. In the present embodiment, the printing device 1 can select one of six different types of editing methods. Here, sample cases of applying each of these six types of editing methods to a target area H will be described with reference to FIG. 8.

The first through fourth editing methods all divide the target image into a plurality of partial images each having one or more units of columns, and print data is edited by shifting each of the partial images in the sub-scanning direction Y by a slide amount corresponding to that partial image. More specifically, the CPU 7 divides the target image into J rectangular partial images (where J is a natural number) that are elongated in the sub-scanning direction Y. The CPU 7 then moves each partial image in the sub-scanning direction Y within a range from an initial position indicated by the dotted line PM. This range satisfies editing conditions including the three conditions described below. Here, J may be set as needed but is 10 in the present embodiment. When the target image includes a border whose longitudinal direction is parallel to the sub-scanning direction Y, such as the borders G5 and G6 in the input image G, the CPU 7 may adjust the length of the rectangular partial image in the main scanning direction X such that the border portion whose longitudinal direction is parallel to the sub-scanning direction Y is not arranged on the boundary between two rectangular partial images adjacent in the main scanning direction X. Note that the length of each rectangular partial image in the sub-scanning direction y may be the same or different from each other.

The first condition is that when comparing the target image and print image by column units, each of which includes a plurality of dots aligned continuously in the sub-scanning direction Y partially or entirely from an upstream end DE on the upstream side Y2 in the sub-scanning direction Y to a downstream end UE on the downstream side Y1 in the sub-scanning direction Y, coincidence of an image included in each column of the print image and an image included in the corresponding column of the target image is maximized either when the column of the print image is at the same position as the corresponding column of the target image or when the column of the print image has been shifted in the sub-scanning direction Y by a corresponding shift amount relative to the corresponding column of the target image, and the maximum value of the absolute values of the shift amounts for the plurality of columns is at least one dot.

The coincidence is a value obtained by dividing the number of sub-dots whose ON/OFF values match, when comparing ON/OFF values of sub-dots in the column at the same position in the main scanning direction X for both the target image and print image, by the number of sub-dots in that column. The coincidence is a number between 0 and 1. The shift amounts for the plurality of columns are each an amount of shift for maximizing the coincidence for the corresponding column. The shift amount is expressed by a positive value when the partial image is shifted toward the downstream side Y1 in the sub-scanning direction Y and a negative value when the partial image is shifted toward the upstream side Y2 in the sub-scanning direction.

The second condition is that an absolute difference value for any two neighboring columns in the main scanning direction X is one dot or less. The absolute difference value for two columns is the absolute value of the difference in shift amounts between that two columns. The third condition is that at least one of the absolute difference values for all the possible combinations of two columns is less than one dot, represented by sub-dots formed by dividing a dot into a plurality of equal parts in the sub-scanning direction Y.

For example, when comparing the ON/OFF values of sub-dots in columns at the same positions in the main scanning direction X for each column in an input image J1 and a print image J2 shown in FIG. 18, the coincidence is the maximum value, i.e., 1 when dots are shifted −3 sub-dots, −2 sub-dots, −2 sub-dots, −1 sub-dot, −1 sub-dot, 0 sub-dots, and 0 sub-dots in the sub-scanning direction Y for columns 1 through 7. Since three sub-dots are equivalent to one dot in this example, the input image J1 and print image J2 satisfy the first condition. Further, since the absolute value of the difference in shift amounts between any two neighboring columns in the main scanning direction X (i.e., the absolute difference value for any two neighboring columns in the main scanning direction X) is either 1 sub-dot or 0 sub-dots, the input image J1 and print image J2 satisfy both the second condition and third condition.

On the other hand, when comparing columns 1 through 7 in sequence from the first side X1 toward the second side X2 in the main scanning direction X between the input image J1 and a print image J4, which is generated in a conversion process (described later) executed after execution of the editing process to convert some of the print data in the printing areas from ON to OFF, the shift amounts are the same but the coincidence for the columns with identification numbers 2 through 6 is $^{14}/_{15}$ each, which is smaller than 1. Since the shift amount for each column when comparing the input image J1 with the print image J4 is identical to the shift amount for each column when comparing the input image J1 to the print image J2, the input image J1 and print image J4 also satisfy each of the first, second, and third conditions.

The length of one dot in the sub-scanning direction Y differs according to the resolution of the print image. The length of one dot in the sub-scanning direction Y also depends on the resolution of the elements 61 but falls within an approximate range of 20 to 170 μm. Hence, the second condition may be that the absolute value of the difference in shift amounts between any two columns that are adjacent in the main scanning direction X (i.e., the absolute difference value for any two neighboring columns in the main scanning direction X) be less than or equal to 150 μm. In the present embodiment, the CPU 7 further edits the target image such that the absolute values of shift amounts in the center region of the main scanning direction X are minimized. Areas of the input image J1 that correspond to consecutive print areas are also consecutive in the print images J2 and J4.

Figure 8:
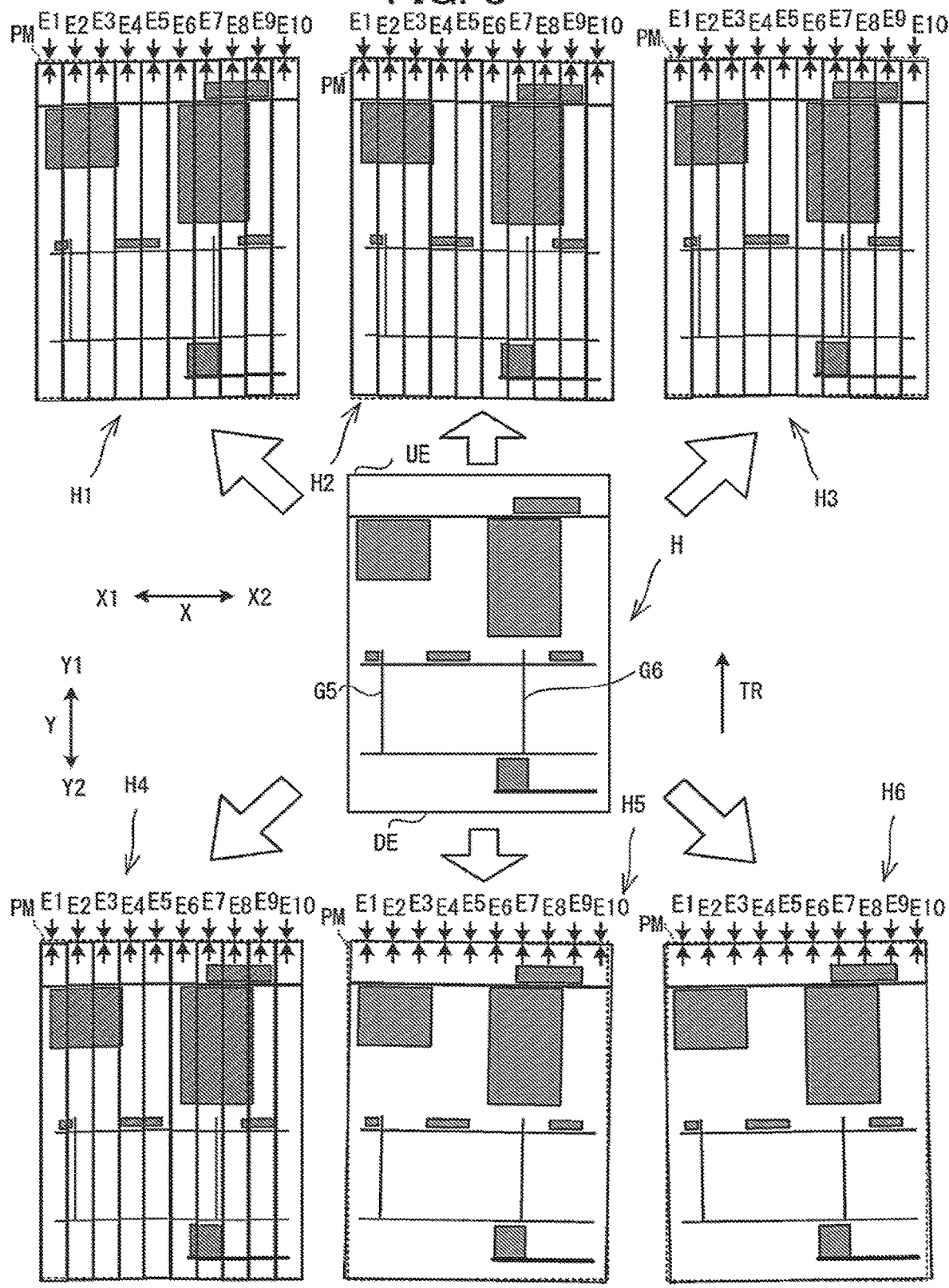
FIG. 8 is an explanatory diagram illustrating an editing method.

In the first editing method, if the slide amount for shifting the partial image toward the upstream side Y2 in the sub-scanning direction Y is a negative value and the slide amount for shifting the partial image toward the downstream side Y1 in the sub-scanning direction Y is a positive value, the target image is edited such that the slide amount is a larger value toward the second side X2 from the first side X1 in the main scanning direction X, i.e., in the direction 90 degrees clockwise from the downstream side Y1 in the sub-scanning direction Y. More specifically, as shown in FIG. 8, when the first editing method is applied to a target image H shown in the middle of FIG. 8, the CPU 7 sets prescribed amounts E1 through E10 for first through tenth rectangular partial images beginning from the first side X1 in the main scanning direction X to −5 sub-dots, −4 sub-dots, −3 sub-dots, −2 sub-dots, −1 sub-dot, 0 sub-dots, 1 sub-dot, 2 sub-dots, 3 sub-dots, and 4 sub-dots, respectively, to generate an edited image H1. In the first editing method, the difference between slide amounts for any two neighboring columns is 1 sub-dot and is a value less than one dot, represented by sub-dots formed by dividing a dot into a plurality of equal parts in the sub-scanning direction Y. The maximum value of the absolute values of the slide amounts is 5 sub-dots, which is greater than or equal to one dot.

Similarly, in the second editing method, if the slide amount for shifting the partial image toward the upstream side Y2 in the sub-scanning direction Y is a negative value and the slide amount for shifting the partial image toward the downstream side Y1 in the sub-scanning direction Y is a positive value, the target image is edited such that the slide amount is a smaller value toward the second side X2 from the first side X1 in the main scanning direction X, i.e., in the direction 90 degrees clockwise from the downstream side Y1 in the sub-scanning direction Y. More specifically, when the second editing method is applied to the target image H, the CPU 7 sets the slide amounts E1 through E10 for the first through tenth rectangular partial images beginning from the first side X1 in the main scanning direction X to 5 sub-dots, 4 sub-dots, 3 sub-dots, 2 sub-dots, 1 sub-dot, 0 sub-dots, −1 sub-dot, −2 sub-dots, −3 sub-dots, and −4 sub-dots, respectively, to generate an edited image H2.

In the third editing method, the target image is edited such that there is only one extreme value among slide amounts in the main scanning direction X. More specifically, when the third editing method is applied to the target image H, the CPU 7 sets the shift amounts E1 through E10 for the first through tenth rectangular partial images beginning from the first side X1 in the main scanning direction X to −4 sub-dots, −3 sub-dots, −2 sub-dots, −1 sub-dot, 0 sub-dots, −1 sub-dots, −2 sub-dots, −3 sub-dots, −4 sub-dots, and −5 sub-dots, respectively, to generate an edited image H3. The extreme value in the third editing method is 0 sub-dots, which corresponds to the fifth partial image from the first side X1.

In the fourth editing method, the target image is edited such that there are two or more extreme values among slide amounts in the main scanning direction X. More specifically, when the fourth editing method is applied to the target image H, the CPU 7 sets the slide amounts E1 through E10 for the first through tenth rectangular partial images beginning from the first side X1 in the main scanning direction X to −3 sub-dots, −2 sub-dots, −1 sub-dots, 0 sub-dots, 0 sub-dots, −1 sub-dots, −2 sub-dots, −3 sub-dots, −2 sub-dots, and −1 sub-dots, respectively, to generate an edited image H4. The extreme values in the fourth editing method are 0 sub-dots corresponding to the fourth and fifth partial images from the first side X1 and −3 sub-dots corresponding to the eighth partial image from the first side X1.

In the fifth editing method, the target image is rotated clockwise around a reference by a prescribed angle. In the sixth editing method, the target image is rotated counter-clockwise around a reference by a prescribed angle. The reference in the present embodiment is set, for example, to the center of the target image in consideration for minimizing the absolute value of slide amounts in the center region relative to the main scanning direction X. A suitable prescribed angle is set based on the size of the print target F, the target image, and the like. For example, the prescribed angle is a value between 0 and 10 degrees, and preferably a value less than or equal to 1 degree, and more preferably a value less than or equal to 0.5 degrees. The CPU 7 generates an edited image H5 when applying the fifth editing method to the target image H with a prescribed angle of 1 degree and generates an edited image H6 when applying the sixth editing method to the target image H with a prescribed angle of 1 degree.

When comparing slide amounts E1 through E10 of partial images for a case in which a target image is divided into J rectangular partial images elongated in the sub-scanning direction Y, as in the first through fourth editing methods, all of the first, second, and third conditions are satisfied both in the edited image H5 to which the fifth editing method has been applied and in the edited image H6 to which the sixth editing method has been applied. In a case where the fifth editing method of sixth editing method is applied to the target image, the following conditions are met: the coincidence with the print image is maximized when the target image is rotated a prescribed angle around the reference; and moving amounts of the farthest areas of the target image from the reference are more than 1 dot.

In S33 the CPU 7 generates an edited image using the editing method acquired in S32 to edit the target image. In S34 the CPU 7 acquires the printing speed for printing the edited image generated in S33. The CPU 7 acquires the printing speed when the editing process is performed while accounting for the number of lines and number of blocks to be used in divisional printing. Subsequently, the CPU 7 ends the comparison condition acquisition process described above and returns to the printing process of FIG. 3.

Following the process in S10, in S11 the CPU 7 determines whether to execute the editing process on the target image. The criteria for determining whether to execute the editing process on the target image may be set as appropriate. For example, the CPU 7 may use a criterion that the user selects from among a plurality of determination criteria or the CPU 7 itself may select the determination criterion based on the type, size, and the like of the input image G.

For example, the CPU 7 may determine that the editing process is to be executed when the target image includes a prescribed number or more of borders extending at least a prescribed length in the main scanning direction X. The prescribed length and prescribed number of borders may be set as appropriate. For example, if the prescribed length is set to half the dimension of the target image in the main scanning direction X and the prescribed number is 3, the CPU 7 determines that the editing process should be executed since the target image H includes three borders G1-G3 that are longer than half the dimension of the target image in the main scanning direction X.

Alternatively, the CPU 7 may execute the editing process when the image data contains a line in which the ratio of the peak of current required in the print head 6 to the maximum current that can be outputted from the power supply 10 is greater than a threshold value. Alternatively, the CPU 7 may execute the editing process when printing based on edited print data produced from the editing process results in a faster printing speed than when editing by the editing process is not performed. In other words, the CPU 7 may execute the editing process when the printing speed acquired in S34 is faster than the printing speed acquired in S31. If the peak number of ON dots in the edited image becomes less than that in the target image, then the printing speed acquired in S34 may be faster than the printing speed acquired in S31.

If the CPU 7 determines that the editing process is to be executed (S11: YES), in S12 the CPU 7 edits the target image using the editing method acquired in S32. For example, if the first editing method is to be applied to the target image H, as shown in FIG. 8, the CPU 7 edits the print data to produce data representing the edited image H1. When the editing process is executed on a target image that has been set in S9, the CPU 7 performs the editing process on the entire input image G or the entire high-resolution image. When the editing process is executed on a target image that has been set in S6 or S8, the CPU 7 performs the editing process on a portion of the input image G or a portion of the high-resolution image. If the target image has been set to target areas P1-P3 in S8, the CPU 7 executes the editing process only on a partial range of the input image G or high-resolution image in the sub-scanning direction Y. If the editing process is not to be executed (S11: NO), in S13 the CPU 7 generates print data from the image data without editing the target image.

Following the process in S12 or S13, in S14 the CPU 7 determines whether to perform a conversion process. The conversion process is performed to convert the print data in order to reduce the number of ON dots in a line. The criterion for determining whether to perform the conversion process may be preset by the user or the CPU 7 may automatically determine the criterion based on the type and size of print data, the printing speed, the printing quality, the number of ON dots, and the like. If the CPU 7 determines not to perform the conversion process (S14: NO), in S16 the CPU 7 does not perform the conversion process on the target image produced in S12 or S13. If the CPU 7 determines that the conversion process is to be performed (S14: YES), in S15 the CPU 7 performs a conversion process on the target image produced in S12 or S13.

When the printing unit obtained by dividing a dot defined by the elements 61 into M parts in the sub-scanning direction Y is defined as a sub-dot (where M is an integer of 2 or greater), a plurality of sub-dots aligned in the main scanning direction X is defined as a sub-line, the sub-dot whose print data is ON is defined as a printing area, and the area outside the printing region or the sub-dot whose print data is OFF is defined as a non-printing area, the CPU 7 changes the image data or print data for one or more sub-dots in each of all the sub-lines of at least one line in the printing area from ON to OFF in the conversion process. Hereinafter, the sub-dots whose image data or print data is changed from ON to OFF in the conversion process will be called the "conversion sub-dots."

Figure 9:
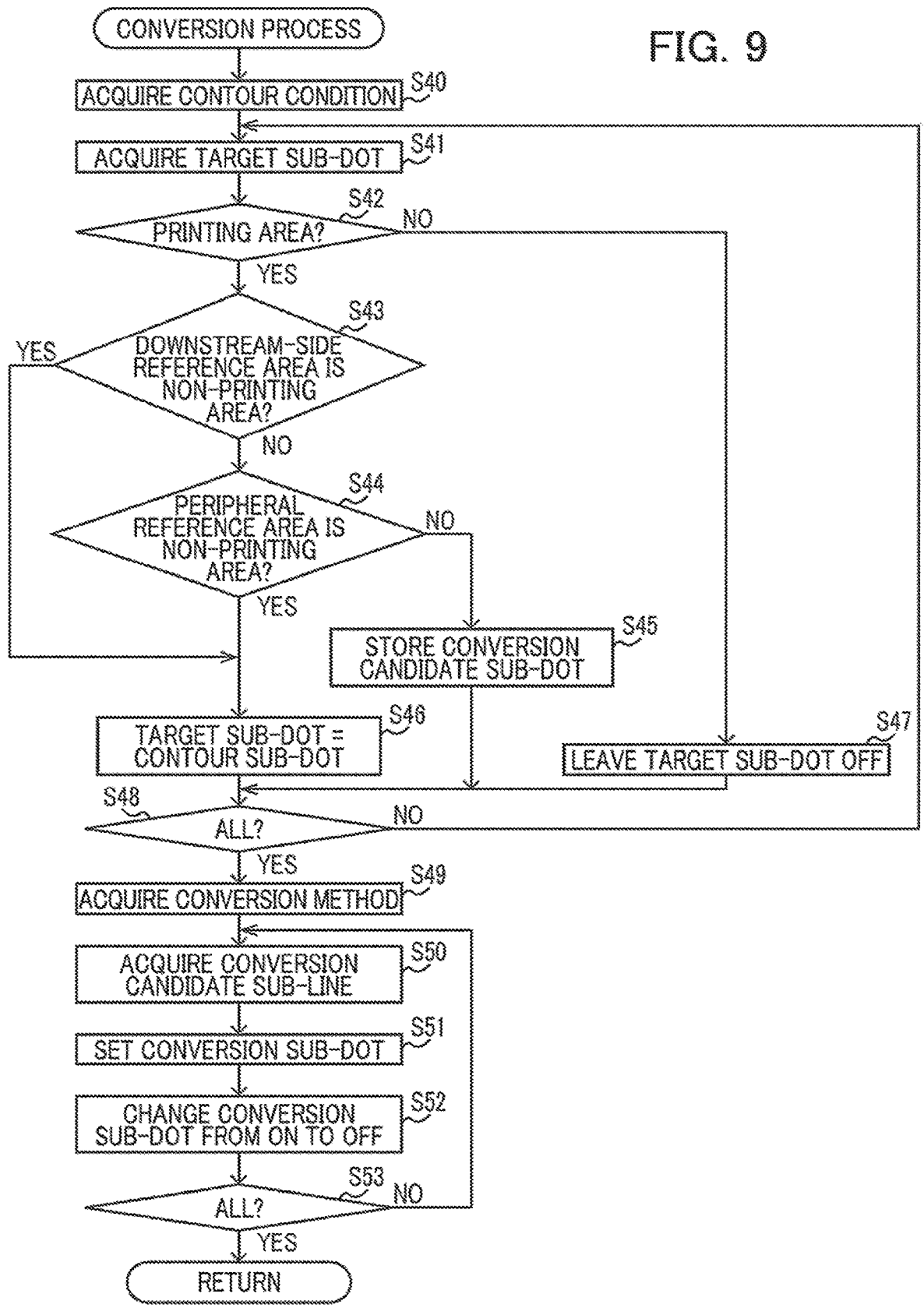
FIG. 9 is a flowchart illustrating steps in a conversion process executed in the printing process.

Next, the conversion process will be described with reference to the flowchart in FIG. 9 and using the schematic drawings in FIGS. 10 through 12 that show areas of a print image represented by print data. In S40 of FIG. 9, the CPU 7 acquires a contour condition. In the present embodiment, the printing device 1 can specify whether print data is to be modified for contour areas of printing areas configured of sub-dots whose print data is ON. Specifically, the CPU 7 specifies the range of a contour area that is not to be subjected to the conversion process using variables U, D, L, and R. For a single continuous printing area, variable U is set for defining the range of the contour on the downstream side Y1 in the sub-scanning direction Y, variable D is set for defining the range of the contour on the upstream side Y2 in the sub-scanning direction Y, variable L is set for defining the range of the contour on the first side X1 in the main scanning direction X, and variable R is set for defining the range of the contour on the second side X2 in the main scanning direction X. The variables U, D, L, and R may be the same value or different values from each other, provided that they are each an integer of 0 or greater. The variables U, D, L, and R may be set by the user or may be set automatically according to the type of the target image and the like. In the present embodiment, the variables U, D, L, and R are 2, 1, 1, and 1, respectively.

In S41 the CPU 7 acquires one sub-dot among the plurality of sub-dots in the print data to be a target sub-dot. For example, the CPU 7 acquires target sub-dots in order from the left side (the first side X1) toward the right side (the second side X2) of the target image and from the top side (the downstream side Y1) toward the bottom side (the upstream side Y2). In S42 the CPU 7 determines whether the target sub-dot is the printing area based on print data for the target sub-dot acquired in S41. If the print data corresponding to the target sub-dot is OFF (S42: NO), in S47 the CPU 7 leaves the print data for that target sub-dot OFF and in S48 determines whether all sub-dots in the print data have been acquired as a target sub-dot in the process of S41. If there remain any sub-dots that have not been acquired in S41 (S48: NO), the CPU 7 returns to S41 and acquires the next target sub-dot in the order of acquisition.

Figure 10:
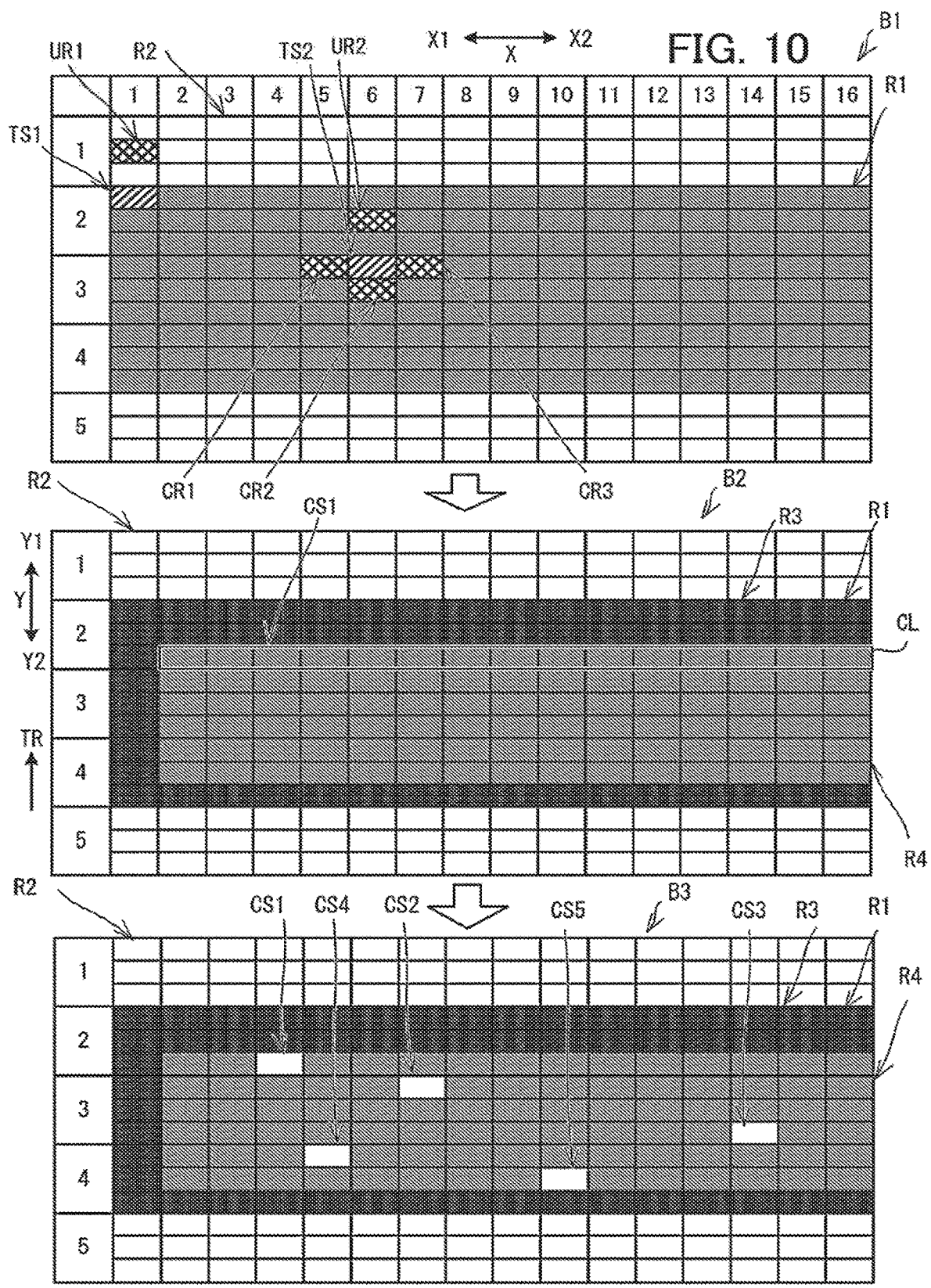
FIG. 10 is an explanatory diagram illustrating the conversion process in a specific example in which the editing process is not performed.
Figure 11:
FIG. 11 is an explanatory diagram illustrating a conversion method.

In the example of FIG. 10, a target sub-dot TS1 is depicted with diagonal shading lines. Since the print data corresponding to the target sub-dot TS1 is ON (S42: YES), in S43 the CPU 7 determines whether a downstream-side reference area is a non-printing area. The downstream-side reference area is one or more sub-dots located on the downstream side Y1 in the sub-scanning direction Y relative to the target sub-dot. In the present embodiment, the downstream-side reference area is the U-th sub-dot on the downstream side Y1 in the sub-scanning direction Y relative to the target sub-dot. The downstream-side reference area for the target sub-dot TS1 is a sub-dot UR1 depicted with lattice shading. Since the print data for the sub-dot UR1 is OFF (S43: YES), in S46 the CPU 7 determines the target sub-dot TS1 as a contour sub-dot constituting the contour area and thus leaves the print data for the target sub-dot TS1 ON. Subsequently the CPU 7 advances to S48 described above. In this way, when one target sub-dot among the plurality of sub-dots is a printing area (S42: YES), the CPU 7 sets the reference sub-dot for the target sub-dot to the U-th sub-dot (where U is any integer of 0 or greater) on the downstream side Y of in the sub scanning direction Y relative to this target sub-dot. If the reference sub-dot is a non-printing area (S43: YES), the CPU 7 assumes the target sub-dot is a contour sub-dot and in S46 leaves the image data or print data for the contour sub-dot ON.

When a target sub-dot TS2 depicted with diagonal shading lines is acquired in S41 (S42: YES), the downstream-side reference area for the target sub-dot TS2 is a sub-dot UR2 depicted with lattice shading. Since the print data for the sub-dot UR2 is ON (S43: NO), in S44 the CPU 7 determines whether any peripheral reference areas are non-printing areas. The peripheral reference areas are one or more sub-dots surrounding the target sub-dot. For example, the peripheral reference areas include the L-th sub-dot on the first side X1 in the main scanning direction X relative to the target sub-dot, the R-th sub-dot on the second side X2 in the main scanning direction X relative to the target sub-dot, and the D-th sub-dot on the upstream side Y2 in the sub-scanning direction Y relative to the target sub-dot. If at least one of the peripheral reference areas is a non-printing area (S44: YES), the CPU 7 advances to S46 described above. Thus, when one target sub-dot among the plurality of sub-dots is a printing area (S42: YES), in S46 the CPU 7 determines that the target sub-dot is a contour sub-dot when any of the U-th sub-dot on the downstream side Y1 in the sub-scanning direction Y, the D-th sub-dot on the upstream side Y2 in the sub-scanning direction Y, the L-th sub-dot on the first side X1 in the main scanning direction X, and the R-th sub-dot on the second side X2 in the main scanning direction X relative to the target sub-dot is a non-printing area (S43: YES or S44: YES). In this case, in S46 the CPU 7 leaves the image data or print data for the contour sub-dot ON.

The peripheral reference areas for the target sub-dot TS2 are sub-dots CR1, CR2, and CR3 depicted with lattice shading. Since none of the print data for the sub-dots CR1, CR2, and CR3 are OFF in this example (S44: NO), in S45 the CPU 7 stores the target sub-dot TS2 as a conversion candidate sub-dot and advances to S48 described above. Through the process from S41 to S48, sub-dots in a portion of a printing area R1 in a partial image B1 shown in the top of FIG. 10 are set as contour sub-dots constituting the area R3 depicted with dark shading in the partial image B2 shown in the middle of FIG. 10, while sub-dots in a remaining area R4 are set as conversion candidate sub-dots. Thus, when one target sub-dot among the plurality of sub-dots is the printing area (S42: YES), in S45 the CPU 7 sets this target sub-dot as a conversion candidate sub-dot when all of the U-th sub-dot on the downstream side Y1 in the sub-scanning direction Y, D-th sub-dot on the upstream side Y2 in the sub-scanning direction Y, L-th sub-dot on the first side X1 in the main scanning direction X, and R-th sub-dot on the second side X2 in the main scanning direction X relative to the target sub-dot are the printing area (S43: NO and S44: NO). Through the subsequent process in S49 through S53, the CPU 7 changes the print data for one or more conversion candidate sub-dots from ON to OFF in all sub-lines of at least one line within all conversion candidate sub-dots in the image data (S51, S52).

Once all sub-dots have been acquired as target sub-dots in S41 (S48: YES), in S49 the CPU 7 acquires the method of converting the one or more conversion candidate sub-dots that have been stored in S45. The conversion method may be specified by the user or may be selected by the CPU 7 based on the type and size of the input image G, the printing speed, the printing quality, and the like. In the present embodiment, the printing device 1 can select one of four conversion methods.

Next, the four conversion methods when applied to a partial image V will be described with reference to FIG. 11. The partial image V is an image having five dots in the sub-scanning direction Y and seven dots in the main scanning direction X. Among the sub-dots configuring the partial image V, those sub-dots depicted with dark shading have been set as contour sub-dots, while those sub-dots depicted with light shading have been set as conversion candidate sub-dots.

In the first conversion method, print data for the conversion candidate sub-dots is changed from ON to OFF at a ratio of B/C (where B and C are natural numbers) in the main scanning direction X and a ratio of B/C in the sub-scanning direction Y. B/C is appropriately set so as to be a value greater than 0 and less than 1 and is preferably set to a value no greater than 0.5. In the example of FIG. 11, B/C is ⅕. If a fraction is present in the conversion candidate sub-dots along the main scanning direction X and sub-scanning direction Y when applying the first conversion method, as in the partial image V of FIG. 11, the CPU 7 may apply the first conversion method over a range in which the first conversion method can be applied and may apply another method to the remaining area, as in the partial image V1. In consideration for cases in which fractions appear in the conversion candidate sub-dots along the main scanning direction X and sub-scanning direction Y when applying the first conversion method, the CPU 7 may set B/C as a target value and may set the number of conversion sub-dots to be changed from ON to OFF as close as possible to the target value.

In the second conversion method, when print data for a target sub-dot is ON and sub-dots adjacent to the target sub-dot on the upstream side Y2 and downstream side Y1 in the sub-scanning direction Y are conversion sub-dots, the CPU 7 leaves the print data for the target sub-dot ON. That is, the second conversion method converts print data so that no conversion sub-dots to be changed from ON to OFF are continuous in the sub-scanning direction Y, as in the partial image V2 in FIG. 11.

In the third conversion method, when print data for a target sub-dot is ON and at least one sub-dot adjacent to the target sub-dot in the main scanning direction X is a conversion sub-dot, the CPU 7 leaves the print data for the target sub-dot ON. That is, the third conversion method converts print data so that no conversion sub-dots to be changed from ON to OFF are continuous in the main scanning direction X, as in the partial image V3 in FIG. 11.

In the fourth conversion method, when print data for a target sub-dot is ON and at least one of the eight peripheral sub-dots of the target sub-dot is a conversion sub-dot, the CPU 7 leaves the print data for the target sub-dot ON. That is, the fourth conversion method converts print data so that no conversion sub-dots to be changed from ON to OFF are continuous in any of the eight directions. In FIG. 11, the eight directions are toward the upper side, upper-right side, right side, lower-right side, lower side, lower-left side, left side, and upper-left side of the target sub-dot. In the second through fourth conversion methods, the ratio of conversion sub-dots to conversion candidate sub-dots may be set as desired in the main scanning direction X and sub-scanning direction Y.

In S50 the CPU 7 acquires a conversion candidate sub-line, which is one sub-line formed by one or more conversion candidate sub-dots that have been stored in S45, according to a predetermined order. In the present embodiment, the CPU 7 acquires conversion candidate sub-lines in order from the downstream side Y1 in the sub-scanning direction Y. For example, the CPU 7 acquires a conversion candidate sub-line CL farthest on the downstream side Y1 in the sub-scanning direction Y of the area R4 (i.e., the conversion candidate sub-line located the most downstream in the sub-scanning direction Y in the area R4), as shown in the middle of FIG. 10. In S51 the CPU 7 uses the conversion method acquired in S49 to set conversion sub-dots from among the conversion candidate sub-dots in the conversion candidate sub-line acquired in S50. For example, the CPU 7 sets a sub-dot CS1 in the conversion candidate sub-line CL as a conversion sub-dot. In S52 the CPU 7 changes the print data of sub-dots that have been set as conversion sub-dots in S51 from ON to OFF. In S53 the CPU 7 determines whether all conversion candidate sub-lines have been acquired in the process of S50. When there remain any sub-lines that have not been acquired in S50 (S53: NO), the CPU 7 returns to S50. Once all conversion candidate sub-lines have been acquired in S50 (S53: YES), the CPU 7 ends the conversion process and returns to the printing process of FIG. 3.

As an example, when the fourth conversion method is applied to a partial image B2 in the middle of FIG. 10, the partial image B2 is converted into a partial image B3 shown in the bottom of FIG. 10 in which print data for conversion sub-dots CS1 through CS5 has been changed from ON to OFF. On the other hand, if the fourth conversion method is applied in S15 to a partial image C1 that has been subjected to the first editing method in S12, the partial image C1 is converted into a partial image C2 in which print data is modified as illustrated in FIG. 12. If the resolution is 165 dpi and the editing process is executed using the second editing method employing the condition that the difference in slide amounts between any two partial images neighboring each other in the main scanning direction X has an absolute value of 150 μm or less, then when performing the editing process and conversion process on a border extending in the main scanning direction X and having a thickness of 1 dot, 2 dots, 3 dots, 4 dots, 6 dots, 8 dots, or 16 dots, as shown in FIG. 13, the CPU 7 can reduce the number of ON dots while inclining the border to a degree that is not visually noticeable.

More specifically, edited parts in a print image having conditions shown in FIG. 13 are more difficult to notice than in a print image edited using the second editing method under conditions of a comparative example shown in FIG. 19 in which the resolution is 165 dpi and the difference in slide amounts between any two partial images neighboring each other in the main scanning direction X has an absolute value of 300 μm. Note that the length of one dot in the sub-scanning direction Y when the resolution is 165 dpi is approximately 154 μm. FIGS. 13 and 19 show cases in which the values of U and D are both 3 (equivalent to one dot) and the conversion process is executed using the third conversion method that satisfies the condition of B/C equaling ½.

Following S15 or S16, in S17 the CPU 7 determines whether the target image is one of the input image G and the high-resolution image or not. When either the input image G or the high-resolution image has been set as the target image in S9 (S17: YES), in S19 the CPU 7 does not perform a process to combine partial images. However, when the target image is neither the input image G nor the high-resolution image (S17: NO), the CPU 7 advances to S18. For example, if the non-feature area H has been set as the target image in S6 and the target image has been edited using the sixth editing method in S12 (S17: NO), then in S18 the CPU 7 edits the print data by combining the edited image H6 that has been subjected to processing from S11 to S16 with the feature area P4 that has not been subjected to processing from S11 to S16 in order to form data for printing a composite image G9, as shown in FIG. 14. Since the feature area P3 in the composite image G9 has not been subjected to the editing process and conversion process, this area perfectly matches the feature area P4 in the input image G or high-resolution image. However, some portions of the composite image G9 other than the feature area P4 have been subjected to the editing process and conversion process and have parts that do not match those in the input image G or high-resolution image other than the feature area P4. The same applies in S18 when the target area H has been set as the target image in S8 (S17: NO).

If the target areas P1-P3 have been set as the target image in S8 and the target image has been edited using the first editing method in S12 (S17: NO), in S18 the CPU 7 edits the print data by combining the target areas P1-P3 that have been subjected to processing from S11 to S16 with a non-target area J hat has not been subjected to processing from S11 to S16 in order to form data for printing a composite image G10, as shown in FIG. 15. Since portions of the composite image G10 excluding the target areas P1-P3 have not been subjected to the editing process and conversion process, these portions perfectly match portions of the input image G or high-resolution image excluding the target areas P1-P3. However, portions of the composite image G10 corresponding to the target areas P1-P3 have been subjected to the editing and conversion processes and have parts that do not match portions in the input image G or high-resolution image corresponding to the target areas P1-P3. In the composite image G10, all the first, second, and third conditions are met when comparing a plurality of dots constituting the input image G and a plurality of dots constituting the print image to be printed according to the print data by units of columns constituted by a plurality of continuous dots in the sub-scanning direction Y within the target area P1. The target area P1 is a portion of the image between the upstream end DE on the upstream side Y2 in the sub-scanning direction Y and the downstream end UE on the downstream side Y1 in the sub-scanning direction Y. The first, second, and third conditions are similarly met for the target areas P2 and P3.

Following S18 or S19, in S20 the CPU 7 determines whether divisional printing should be performed. Divisional printing is a method of printing one line in the main scanning direction X within the print data by dividing the elements 61 into N blocks (where N is an integer of 2 or greater) and sequentially energizing N blocks at different timings such that the peak of current flowing in the print head 6 required when printing one line based on the print data is suppressed to a current value less than or equal to the maximum current that the power supply 10 can supply to the print head 10. The criteria for determining whether to perform divisional printing may be set as needed. For example, the CPU 7 may determine whether to perform divisional printing based on the number of ON dots in each line. When divisional printing is to be performed (S20: YES), in S21 the CPU 7 edits the print data such that at least some of the lines in the print data are divided into N parts in the sub-scanning direction Y. The method of division may be set as needed. In the present embodiment, the CPU 7 divides the printing cycle for one line into a plurality of sub-printing cycles of the same length, including a sub-printing cycle having the same start time as the printing cycle. The CPU 7 may set the method of division based on the editing method used in S12.

Figure 12:
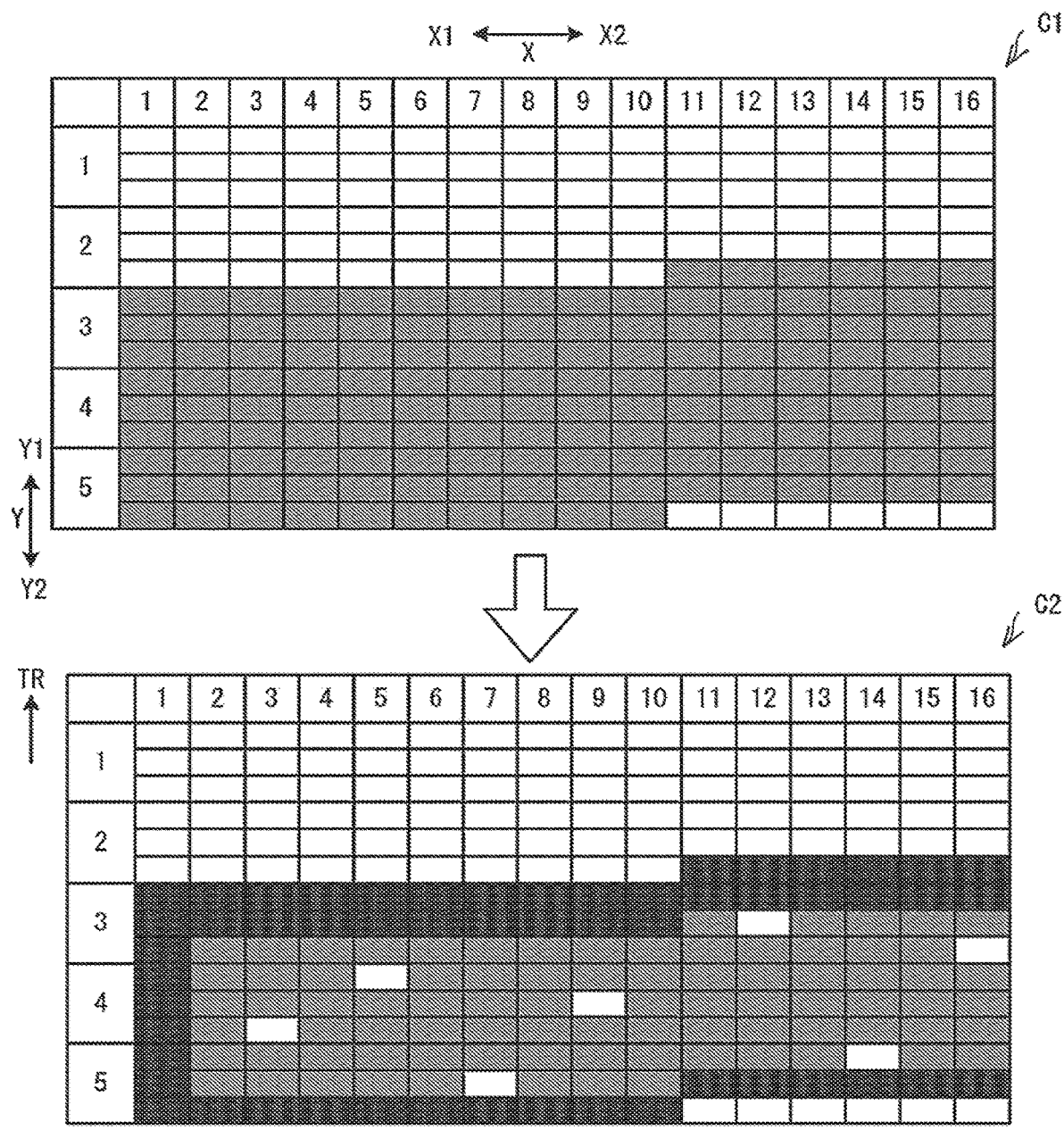
FIG. 12 is an explanatory diagram illustrating the conversion process in a specific example in which the editing process is performed.

When the CPU 7 edits print data in the editing process of FIG. 12 such that the slide amount has a smaller value from the first side X1 toward the second side X2 in the main scanning direction X (here, the slide amount toward the upstream side Y2 in the sub-scanning direction Y is a negative value and the slide amount toward the downstream side Y1 in the sub-scanning direction Y is a positive value), as in an image M1 of FIG. 16, in a divisional printing process the CPU 7 edits the print data such that the N blocks of the elements 61 are energized at different timings in sequence from the first side X1 toward the second side X2 in the main scanning direction X, as indicated in an image M2 of FIG. 16. Note that FIG. 16 shows the case of N being 2. The line having identification number 1 in the image M1 is divided into two parts, namely a line having identification number 1 and a line having identification number 1' in the image M2. Similarly, the line having identification number 2 in the image M1 is divided into two parts, namely a line having identification number 2 and a line having identification number 2' in the image M2.

When the CPU 7 edits print data in the editing process of S12 such that the slide amount has a larger value from the first side X1 toward the second side X2 in the main scanning direction X (here, the slide amount toward the upstream side Y2 in the sub-scanning direction Y is a negative value and the slide mount toward the downstream side Y1 in the sub-scanning direction Y is a positive value), as in an image M3 of FIG. 17, in the divisional printing process the CPU 7 edits the print data such that the N blocks of the elements 61 are energized at different timings in sequence from the second side X2 toward the first side X1 in the main scanning direction X, as depicted in an image M4 in FIG. 17. Note that FIG. 17 shows the case of N being 2. Here, the line having identification number 1 in the image M3 is divided into two parts, namely a line having identification number 1 and a line having identification number 1' in the image M4. Similarly, the line having identification number 2 in the image M3 is divided into two parts, namely a line having identification number 2 and a line having identification number 2' in the image M4. The CPU 7 sets the printing start timings for the sub-lines such that those start timings arrive at equal time intervals.

In S23 the CPU 7 performs divisional printing based on the print data edited in S21. The CPU 7 executes divisional printing by driving the elements 61 in a plurality of sub-printing cycles. If divisional printing is not to be performed (S20: NO), in S22 the CPU 7 performs a printing process based on the print data produced in S18 or S19. The CPU 7 sets the heating quantity of elements 61 larger for conversion candidate sub-dots than contour sub-dots according to the print data and executes a printing process for forming an image on the print target F by heating the elements 61 in S22 or S23. Following S22 or S23, the CPU 7 ends the printing process.

In the embodiment described above, the printing device 1 is an example of the printing device and print data editing device of the present disclosure. The elements 61 is an example of the plurality of elements of the present disclosure. The print head 6 is an example of the print head of the present disclosure. The conveying unit 5 is an example of the conveying unit of the present disclosure. The CPU 7 is an example of the controller and the processor of the present disclosure. The communication unit 4 is an example of the communication interface of the present disclosure. The storage unit 9 is an example of the non-transitory computer-readable storage medium of the present disclosure. The process of S1 is an example of the acquiring in (a) of the present disclosure. The process of S12 is an example of the editing in (b) of the present disclosure. The process of S3 is an example of the increasing in (c) of the present disclosure. The process of S22 and S23 is an example of the executing in (d) of the present disclosure. The process of S15 is an example of the converting in (e) of the present disclosure. The process of S11 is an example of the determining in (f) of the present disclosure. The process of S21 is an example of the dividing in (g) of the present disclosure The process of S22 is an example of the executing of the present disclosure.

The printing device 1 according to the embodiment described above is provided with the print head 6, conveying unit 5, and CPU 7. The printing device 1 has a plurality of elements 61 linearly aligned in the main scanning direction X. The conveying unit 5 causes the print target and print head 6 to move relative to each other in the sub-scanning direction Y, which crosses the main scanning direction X. The printing device 1 edits print data to be used by the printing device 1 for forming an image on the print target F such that the print data includes data specifying either ON or OFF for each of the plurality of elements 61.

In the printing process, the printing device 1 moves the print head 6 in the sub-scanning direction Y relative to the print target F while driving the elements 61 based on the print data to form an image on the print target F by lines corresponding to the elements 61 aligned in the main scanning direction X. The CPU 7 acquires image data associated with the elements 61 aligned in the main scanning direction X (S1).

The CPU 7 performs an editing process to edit print data corresponding to the image data (S12). Specifically, when comparing a plurality of dots constituting an input image G represented by image data with a plurality of dots constituting a print image printed based on print data by units of columns, each of which includes all of a plurality of dots aligned in the sub-scanning direction Y from the upstream end DE on the upstream side Y2 in the sub-scanning direction Y to the downstream end UE on the downstream side Y1 in the sub-scanning direction Y, the CPU 7 performs an editing process to edit the print data such that coincidence of an image included in each column of the print image and an image included in the corresponding column of the input image is maximized either when the column of the print image is at the same position as the corresponding column of the target image or when the column of the print image has been shifted in the sub-scanning direction Y by a corresponding shift amount relative to the corresponding column of the input image, the maximum value of the absolute values of the shift amounts for the plurality of columns is at least one dot, and the absolute difference value for any two columns that neighbor each other in the main scanning direction X is less than or equal to one dot, or less than or equal to 150 μm.

For example, the CPU 7 acquires data representing the image H shown in FIG. 8 as image data representing an input image G and edits the print data corresponding to this image data to generate data corresponding to any of images H1 through H6. By executing the editing process, the printing device 1 can edit the print data to suppress the peak current in the print head 6 required for printing one line. Since the printing device 1 performs the editing process by comparing all dots aligned in the sub-scanning direction Y in units of columns in order that coincidence is maximized when the image included in a column of the print image is at the same position as the image included in a column of the input image G or has been shifted by a shift amount in the sub-scanning direction relative to the image included in a column of the input image G, the printing device 1 can produce a print image in which edited parts are less unnoticeable than in a method of partially editing dots included in the input image G, as in the conventional technology, without sacrificing printing speed.

Further, the printing device 1 keeps the absolute value of differences in shift amounts for two columns neighboring each other in the main scanning direction X less than or equal to one dot or less than or equal to 150 μm so that areas of the print image that have been changed from the input image G are less noticeable, enabling the printing device 1 to suppress changes to the extent that they are visually imperceptible. By reducing the number of elements 61 in a single line that are ON, the printing device 1 can more likely achieve a faster printing speed than a conventional method that does not implement the editing process. Accordingly, the printing device 1 can edit print data to improve printing quality compared to the conventional method without sacrificing printing speed.

Editing conditions for the printing device 1 further include the condition that one or more absolute value of differences between shift amounts is less than one dot, where one dot is represented by sub-dots formed by dividing a dot into a plurality of parts in the sub-scanning direction Y. Since the printing device 1 can perform the editing process in units of sub-dots, which are finer than the dot units used for prescribed amounts, the printing device 1 can produce a print image whose edited areas are less noticeable than when prescribed amounts are in units of dots.

In an editing process, the CPU 7 of the printing device 1 divides the input image G into a plurality of partial images having units of columns and edits the print data by shifting each of the partial images in the sub-scanning direction Y by a slide amount specified for that partial image. For example, the CPU 7 divides the image H in FIG. 8 into 10 partial images and edits print data corresponding to any of images H1 through H4 by shifting each partial image in the sub-scanning direction Y a slide amount specified for that partial image. In this way, the printing device 1 can reduce the processing load on the CPU 7 from the editing process, enabling the CPU 7 to implement the editing process with a small memory.

The printing device 1 is provided with the communication unit 4 for acquiring image data from an external device W. In the process of S1, the CPU 7 acquires image data from the external device W via the communication unit 4 (S1). This image data may be generated by the external device W and may have a higher resolution in the sub-scanning direction Y than the resolution defined by the elements 61. Since the printing device 1 acquires high-resolution image data generated by the external device W, there is no need for the printing device 1 to perform a resolution-enhancing process on the image data.

If the image data acquired in S1 has a resolution in the sub-scanning direction Y no greater than the resolution defined by the elements 61, the CPU 7 performs a resolution-enhancing process for increasing the resolution of the image data in the sub-scanning direction Y by dividing each line of the image data in the sub-scanning direction Y (S3).

Thus, the printing device 1 can increase the resolution of image data when the acquired image data has relatively low resolution.

The printing device 1 is provided with the print head 6 and the conveying unit 5. The CPU 7 prints one line extending in the main scanning direction X within the print data by dividing the elements 61 into N blocks (where N is an integer of 2 or greater) and sequentially driving N blocks at different timings such that the peak of current flowing in the print head 6 required when printing one line based on the print data is suppressed to a current value less than or equal to the maximum current that the power supply 10 can supply to the print head 10 (S21, S23). Thus, the printing device 1 can maintain printing quality while printing so that the peak current does not exceed the maximum current that the power supply 10 can supply, even if the peak current supplied to the print head 6 when printing one line based on print data that has undergone the editing process exceeds the maximum current value that the power supply 10 can supply.

The CPU 7 edits print data in the editing process of S12 so that the difference in shift amounts between any two columns adjacent in the main scanning direction X increases toward the upstream side Y2 in the sub scanning direction Y while progressing from the first side X1 toward the second side X2 in the main scanning direction X. In the divisional printing process of S23, the CPU 7 drives each of N blocks of elements 61 at different timings from each other in order from the first side X1 toward the second side X2 in the main scanning direction X. Thus, the printing device 1 can print cleanly at a high speed and with no interruption over a single line.

When a sub-dot is defined as a printing unit obtained by dividing a dot defined by the elements 61 into M parts in the sub-scanning direction Y (where M is an integer of 2 or greater), a sub-line is defined as a plurality of sub-dots aligned in the main scanning direction X, a printing area is defined as sub-dots for which print data indicates ON, and a non-printing area is defined as sub-dots for which print data indicates OFF or the area outside the printing region, the CPU 7 performs a conversion process to change the image data or print data from ON to OFF for one or more sub-dots in all sub-lines of at least one line in the printing area (S15). By executing the conversion process in addition to the editing process, the printing device 1 can maintain printing quality while reducing the possibility of the peak current supplied to the print head 6 exceeding the maximum current value that the power supply 10 can supply.

The CPU 7 executes the editing process when the input image G includes a prescribed number or more of borders extending at least a prescribed length in the main scanning direction X. By executing the editing process when the number of borders extending at least a prescribed length in the main scanning direction X is greater than or equal to a prescribed number, the printing device 1 can suppress the peak current required per line.

The CPU 7 executes the editing process when printing based on the print data edited in the editing process is faster than the printing speed when the editing process is not performed (S12). Therefore, by executing the editing process the printing device 1 can reliably avoid a slower printing speed.

The CPU 7 edits print data in the editing process by including a process for rotating the input image G (S12). The printing device 1 can smoothly edit an input image G by adding this process for rotating the input image G. In this way, the printing device 1 can reduce the relative amount of transformation in geometrical figures when comparing the input image G to the print image.

In the editing process, if the shift amount for shifting the partial image toward the upstream side Y2 in the sub scanning direction Y is a negative value and the shift amount for shifting the partial image toward the downstream side Y1 in the sub scanning direction Y is a positive value, the CPU 7 edits print data so that shift amounts along the main scanning direction X grow larger in a direction rotated 90 degrees clockwise from the downstream side Y1 in the sub scanning direction Y (S12). In this way, the printing device 1 can edit print data such that character strings such as italicized English have good appearance in the print image. Through this editing process, the printing device 1 can suppress the generation of print data that increases the peak current supplied to the print head 6 for character strings such as Japanese hiragana that slope upward to the right.

In the editing process, if the shift amount for shifting the partial image toward the upstream side Y2 in the sub scanning direction Y is a negative value and the shift amount for shifting the partial image toward the downstream side Y1 in the sub scanning direction Y is a positive value, the CPU 7 edits the print data such that shift amounts along the main scanning direction X grow smaller in a direction rotated 90 degrees clockwise from the downstream side Y1 in the sub scanning direction Y (S12). Thus, the printing device 1 can edit print data to have good appearance when the print image includes character strings of Japanese hiragana.

The CPU 7 edits print data to minimize the absolute value of shift amounts in the center region of the image relative to the main scanning direction X (S12). In this way, the printing device 1 can minimize the difference between margins on the two edges of the print image in the sub-scanning direction Y and the difference between margins on the two edges in the main scanning direction X.

In the editing process, the CPU 7 edits print data to produce two or more extreme values among shift amounts in the main scanning direction X (S12). In this way, the printing device 1 can reduce the shift amounts in an image relative to a case having one or no extreme values.

In the editing process, the CPU 7 edits print data to produce one extreme value among shift amounts in the main scanning direction X (S12). Thus, the printing device 1 can reduce the shift amounts in an image relative to a case having no extreme values.

The CPU 7 executes a divisional printing process to print a print image based on print data by dividing a printing cycle for one line into a plurality of sub-printing cycles of the same length, including a sub-printing cycle having the same start time as the printing cycle, and by driving the elements 61 for each of the plurality of sub-printing cycles (S23). By performing the divisional printing process, the printing device 1 can print in smaller units in the sub-scanning direction Y than the dots corresponding to the elements 61.

While the print data editing device, print data editing method, and print data editing program of the present disclosure have been described in detail with reference to specific embodiments thereof, it would be apparent to those skilled in the art that many modifications and variations may be made therein without departing from the spirit of the invention, the scope of which is defined by the attached claims. The invention may be implemented in various forms, such as a non-transitory computer-readable storage medium storing the print data editing program.

The configuration of the printing device 1 may be modified as needed. For example, the printing device 1 may be a thermal printer provided with a thermal line head as the print head 6 for thermally transferring ink from an ink ribbon. Alternatively, the printing device 1 may be an inkjet printer provided with an inkjet line head as the print head 6 and a plurality of piezoelectric elements as the elements 61. Alternatively, the printing device 1 may be an electrophotographic printer provided with an LED line head as the print head 6 and a plurality of light-emitting diodes (LEDs) as the elements 61.

The print data editing device of the present disclosure may be a specialized or a general-purpose device provided separately from the printing device 1 for performing the process from S1 to S19. The configuration of the conveying unit 5 in the printing device 1 may also be modified according to the type of print head 6. The conveying unit 5 may move the print head 6 to change the relative position of the print head 6 and the print target F. The communication unit 4 may be configured to perform wired or wireless communication with the external device W.

Programs that include instructions for executing the process in FIG. 2 may be stored in a storage device of the printing device 1 until the CPU 7 executes the corresponding program. Therefore, each of the method and route for acquiring the program and the device for storing the program may be modified as needed. Programs executed by the printing device 1 may be received from other devices via a cable or wireless communication and stored in a storage unit of the printing device 1 or other storage device. Examples of other devices include PCs and servers connected via a network.

While the CPU 7 executes each step of the printing process in the above examples, all or some of the steps may be executed by another electronic device (an ASIC, for example). Alternatively, steps in the printing process may be executed through distributed processing performed by a plurality of electronic devices (a plurality of CPUs, for example). Steps may also be added to or omitted from the printing process, and the order of the steps may be modified as needed. The following modifications may be incorporated in the printing process as appropriate.

The number and types of editing methods that the CPU 7 can execute may be suitably modified. For example, the CPU 7 may be capable of executing only one of the first through sixth editing methods. The CPU 7 may execute an editing process on the high-resolution image of S3 or the input image G of S4 without receiving any specification for at least one of a feature, target area, and non-target area. When a plurality of target areas P1-P3 has been set, the CPU 7 may apply the same editing method or different editing methods to each target area. The CPU 7 may simply execute the editing process without determining in S11 whether to execute an editing process. When a feature or a non-target area has been specified, the CPU 7 may perform an editing process for setting the prescribed amounts to 0 over a range in the main scanning direction X that includes the specified area. Further, both the second editing condition and third editing condition may be omitted from the editing conditions as appropriate.

The process of S15 may be omitted as appropriate. The CPU 7 may simply execute the conversion process without first determining in S14 whether to execute a conversion process. The number and types of conversion methods that the CPU 7 can execute may be modified as needed. For example, the CPU 7 may be capable of executing only one of the first through fourth conversion methods. The CPU 7 may perform the conversion process using a method other than the first through fourth conversion methods. For example, the CPU 7 may execute a conversion process using a method of changing print data for conversion candidate sub-dots from ON to OFF at different ratios in the main scanning direction X and sub-scanning direction Y. As shown in FIG. 18, the CPU 7 may first edit print data in the print image J2 based on image data in the input image J1 and subsequently perform a conversion process to convert the print data for producing the print image J4. Alternatively, the CPU 7 may first perform a conversion process based on image data in the input image J1 to produce a print image J3 and subsequently execute an editing process for producing the print image J4.

The process of S21 and S23 may be omitted as appropriate. The CPU 7 may execute the process in S21 and S23 without determining in S20 whether divisional printing should be performed. When divisional printing is to be performed, the CPU 7 may determine the order for driving the elements 61 irrespective of the editing method used in S12. The process from S2 to S4 may be modified as needed. When the threshold value for the second condition in the editing process is defined as a length, this threshold value may be modified appropriately to a value of 150 μm or less, and preferably to a value of 50 μm or less, and even more preferably to a value of 20 μm or less. Since the length of one dot in the sub-scanning direction Y falls within an approximate range of 20 to 170 μm, as described above, the threshold value for the difference can be kept more reliably at one dot or less when the threshold value in the second condition is set less than 20 μm. The above variations may be combined as needed to the extent that they are compatible.

What is claimed is:

1. A print data editing device comprising:
a controller configured to edit print data to be used in a printing device, the printing device including: a print head; and a conveying unit, the print head including a plurality of elements linearly arrayed in a main scanning direction, the conveying unit being configured to cause a print target and the print head to move relative to each other in a sub-scanning direction crossing the main scanning direction, the print data including data indicating either ON or OFF for each of the plurality of elements, the printing device being configured to perform image formation on the print target on the basis of the print data while causing the print head and the print target to move relative to each other in the sub-scanning direction to thereby form an image represented by the print data on the print target, the printing device being configured to form the image on the print target line by line by causing, on the basis of the print data, selected one or more of the plurality of elements to be driven, the image represented by the print data being constituted by a plurality of dots defined by the plurality of elements, the controller being configured to perform:
 (a) acquiring print data representing an input image; and
 (b) editing the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b), each column including all the dots aligned in the sub-scanning direction from an upstream end toward a downstream end in the sub-scanning direction, wherein an absolute value of at least one of the shift amounts for the columns in the input image after the editing in (b) is one dot or greater, and an absolute difference value for any two neighboring columns in the main scanning direction in the input image after the editing in (b) is one dot or less, the absolute difference value for two columns being an absolute value of a difference in the shift amounts between the two columns.

2. The print data editing device according to claim 1, wherein in the editing in (b), at least one of a plurality of the absolute difference values for all possible combinations of two columns of the columns is less than one dot, the one dot being represented by one or more sub-dots, each of the sub-dots being formed by dividing the one dot into a plurality of equal parts in the sub-scanning direction.

3. The print data editing device according to claim 1, wherein the editing in (b) comprises:
   (b-1) dividing the input image into a plurality of partial images corresponding to respective ones of the columns; and
   (b-2) shifting each of the plurality of partial images in the sub-scanning direction by a corresponding slide amount, the slide amounts for the plurality of partial images being respective ones of the shift amounts for the columns.

4. The print data editing device according to claim 1, further comprising:
   a communication interface,
   wherein in the acquiring in (a), the controller acquires via the communication interface image data corresponding to the print data from an external device, the image data being generated by the external device and representing the input image having a resolution in the sub-scanning direction higher than a resolution defined by the elements.

5. The print data editing device according to claim 1, wherein the controller is configured to further perform:
   (c) increasing a resolution of the input image represented by the print data acquired in (a) by dividing each line into a plurality of equal parts in the sub-scanning direction.

6. The print data editing device according to claim 1, further comprising:
   the printing device comprising:
      the print head; and
      the conveying unit,
   wherein the controller is configured to further perform:
      (d) executing divisional printing for one line extending in the main scanning direction within the print data after the editing in (b), the divisional printing being executed by dividing the plurality of elements into N blocks and sequentially energizing the N blocks at different timings such that a peak of a current flowing in the print head required when executing printing for the one line on the basis of the print data after the editing in (b) is suppressed to a current value less than or equal to a maximum current value that a power supply can supply to the print head, where N is an integer of two or greater.

7. The print data editing device according to claim 6, wherein assuming that the shift amount toward an upstream side in the sub-scanning direction is a negative value and the shift amount toward a downstream side in the sub-scanning direction is a positive value, in the editing in (b), the controller edits the print data acquired in (a) such that the shift amount has a smaller value from one side toward another side in the main scanning direction, and
wherein in the executing in (d), the N blocks are energized at different timings in sequence from the one side toward the other side in the main scanning direction.

8. The print data editing device according to claim 1, wherein the controller is configured to further perform:
   (e) converting one of the print data before the editing in (b) and the print data after the editing in (b), one line being constituted by a plurality of sub-lines, each sub-line being constituted by a plurality of sub-dots, the sub-dot being a printing unit obtained by dividing one dot into M parts in the sub-scanning direction, where M is an integer of two or greater, the sub-dot for which the print data indicates ON being a printing area, the sub-dot for which the print data indicates OFF being a non-printing area, an area outside a printing region being the nonprinting area, the converting in (e) comprising:
      (e-1) determining, as a conversion sub-dot, one or more of the sub-dots included in the sub-line for each of all the sub-lines constituting the one line within the printing areas in the input image represented by the one of the print data before the editing in (b) and the print data after the editing in (b); and
      (e-2) editing the one of the print data before the editing in (b) and the print data after the editing in (b) such that the one of the print data before the editing in (b) and the print data after the editing in (b) indicates OFF for the one or more sub-dots determined in (e-2) as the conversion sub-dot.

9. The print data editing device according to claim 1, wherein the controller is configured to further perform:
   (f) determining whether the input image represented by the print data acquired in (a) includes a prescribed number or more of borders extending at least a prescribed length in the main scanning direction, and
   wherein the controller performs the editing in (b) in response to determining in (f) that the input image represented by the print data acquired in (a) includes the prescribed number or more of borders.

10. The print data editing device according to claim 1, wherein the controller is configured to further perform:
    (f) determining whether a printing speed for printing the input image after the editing in (b) is faster than a printing speed for printing the input image before the editing in (b), and
    wherein the controller performs the editing in (b) in response to determining in (f) that the printing speed for printing the input image after the editing in (b) is faster than the printing speed for printing the input image before the editing in (b).

11. The print data editing device according to claim 1, wherein in the editing in (b), the controller edits the print data acquired in (a) by rotating the input image represented by the print data acquired in (a).

12. The print data editing device according to claim 1, wherein assuming that the shift amount toward an upstream side in the sub-scanning direction is a negative value and the shift amount toward a downstream side in the sub-scanning direction is a positive value, in the editing in (b), the controller edits the print data acquired in (a) such that the shift amount has a larger value in a direction ninety degrees clockwise from a downstream side in the sub-scanning direction.

13. The print data editing device according to claim 1, wherein assuming that the shift amount toward an upstream side in the sub-scanning direction is a negative value and the shift amount toward a downstream side in the sub-scanning direction is a positive value, in the editing in (b), the controller edits the print data acquired in (a) such that the shift amount has a smaller value in a direction ninety degrees clockwise from a downstream side in the sub-scanning direction.

14. The print data editing device according to claim 1, wherein in the editing in (b), the controller edits the print data acquired in (a) such that an absolute value of the shift amount is minimized in a center region relative to the main scanning direction of the input image after the editing in (b).

15. The print data editing device according to claim 1, wherein in the editing in (b), the controller edits the print data acquired in (a) such that the shift amounts as a function of positions of the columns in the main scanning direction have two or more extreme values.

16. The print data editing device according to claim 1, wherein in the editing in (b), the controller edits the print data acquired in (a) such that the shift amounts as a function of positions of the columns in the main scanning direction have one extreme value.

17. The print data editing device according to claim 1, further comprising:
the printing device comprising:
the print head; and
the conveying unit,
wherein the controller is configured to further perform:
(g) dividing a printing cycle for one line into a plurality of sub-printing cycles, the plurality of sub-printing cycles having a same length as each other and including a sub-printing cycle having a same start time as the printing cycle; and
(h) executing divisional printing for the one line by driving the plurality of elements in the plurality of sub-printing cycles.

18. A print data editing device comprising:
a controller configured to edit print data to be used in a printing device, the printing device including: a print head; and a conveying unit, the print head including a plurality of elements linearly arrayed in a main scanning direction, the conveying unit being configured to cause a print target and the print head to move relative to each other in a sub-scanning direction crossing the main scanning direction, the print data including data indicating either ON or OFF for each of the plurality of elements, the printing device being configured to perform image formation on the print target on the basis of the print data while causing the print head and the print target to move relative to each other in the sub-scanning direction to thereby form an image represented by the print data on the print target, the printing device being configured to form the image on the print target line by line by causing, on the basis of the print data, selected one or more of the plurality of elements to be driven, the image represented by the print data being constituted by a plurality of dots defined by the plurality of elements, the controller being configured to perform:
(a) acquiring print data representing an input image; and
(b) editing the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b), each column including the dots continuously aligned in the sub-scanning direction from an upstream end toward a downstream end in the sub-scanning direction, wherein an absolute value of at least one of the shift amounts for the columns in the input image after the editing in (b) is one dot or greater, and an absolute difference value for any two neighboring columns in the main scanning direction in the input image after the editing in (b) is less than or equal to 150 µm, the absolute difference value for two columns being an absolute value of a difference in the shift amounts between the two columns.

19. A print data editing method performed by a controller of a print data editing device configured to edit print data to be used in a printing device, the printing device including: a print head; and a conveying unit, the print head including a plurality of elements linearly arrayed in a main scanning direction, the conveying unit being configured to cause a print target and the print head to move relative to each other in a sub-scanning direction crossing the main scanning direction, the print data including data indicating either ON or OFF for each of the plurality of elements, the printing device being configured to perform image formation on the print target on the basis of the print data while causing the print head and the print target to move relative to each other in the sub-scanning direction to thereby form an image represented by the print data on the print target, the printing device being configured to form the image on the print target line by line by causing, on the basis of the print data, selected one or more of the plurality of elements to be driven, the image represented by the print data being constituted by a plurality of dots defined by the plurality of elements, the print data editing method comprising:
(a) acquiring print data representing an input image; and
(b) editing the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b), each column including the dots continuously aligned in the sub-scanning direction from an upstream end toward a downstream end in the sub-scanning direction, wherein an absolute value of at least one of the shift amounts for the columns in the input image after the editing in (b) is one dot or greater, and an absolute difference value for any two neighboring columns in the main scanning direction in the input image after the editing in (b) is less than or equal to one dot or less than or equal to 150 µm, the absolute difference value for two columns being an absolute value of a difference in the shift amounts between the two columns.

20. A non-transitory computer-readable storage medium storing a set of computer-readable instructions for a print data editing device comprising a processor configured to edit print data to be used in a printing device, the printing device including: a print head; and a conveying unit, the print head including a plurality of elements linearly arrayed in a main scanning direction, the conveying unit being configured to cause a print target and the print head to move relative to each other in a sub-scanning direction crossing the main scanning direction, the print data including data indicating either ON or OFF for each of the plurality of elements, the printing device being configured to perform image formation on the print target on the basis of the print data while causing the print head and the print target to move relative to each other in the sub-scanning direction to thereby form an image represented by the print data on the print target, the printing device being configured to form the image on the print target line by line by causing, on the basis of the print data, selected one or more of the plurality of elements to be driven, the image represented by the print data being constituted by a plurality of dots defined by the plurality of elements, the set of computer-readable instructions, when executed by the processor, causing the print data editing device to perform:

(a) acquiring print data representing an input image; and (b) editing the print data acquired in (a) such that when the dots constituting the input image represented by the print data acquired in (a) are compared by units of columns before and after performing the editing in (b), a coincidence is maximized when an image of each column in the input image after the editing in (b) is the same position as an image of the corresponding column in the input image before the editing in (b) or is shifted by a corresponding shift amount in the sub-scanning direction relative to the image of the corresponding column in the input image before the editing in (b), each column including the dots continuously aligned in the sub-scanning direction from an upstream end toward a downstream end in the sub-scanning direction, wherein an absolute value of at least one of the shift amounts for the columns in the input image after the editing in (b) is one dot or greater, and an absolute difference value for any two neighboring columns in the main scanning direction in the input image after the editing in (b) is less than or equal to one dot or less than or equal to 150 μm, the absolute difference value for two columns being an absolute value of a difference in the shift amounts between the two columns.

* * * * *